(12) United States Patent
Waite et al.

(10) Patent No.: US 11,162,834 B2
(45) Date of Patent: Nov. 2, 2021

(54) WEIGHT-MEASUREMENT RETROFITTING FOR WASTE COMPACTORS

(71) Applicant: BACE, LLC, Charlotte, NC (US)

(72) Inventors: Frederick Waite, Huntersville, NC (US); Drew Sigmund, Jr., Mint Hill, NC (US)

(73) Assignee: BACE, LLC, Charlotte, NC (US)

( * ) Notice: Subject to any disclaimer, the term of this patent is extended or adjusted under 35 U.S.C. 154(b) by 49 days.

(21) Appl. No.: 16/371,915

(22) Filed: Apr. 1, 2019

(65) Prior Publication Data
US 2019/0293478 A1 Sep. 26, 2019

Related U.S. Application Data

(63) Continuation-in-part of application No. 15/483,816, filed on Apr. 10, 2017, now Pat. No. 10,564,029,
(Continued)

(51) Int. Cl.
*G01G 19/02* (2006.01)
*G01G 23/18* (2006.01)
(Continued)

(52) U.S. Cl.
CPC ............ *G01G 19/027* (2013.01); *B09B 5/00* (2013.01); *B65F 1/1405* (2013.01);
(Continued)

(58) Field of Classification Search
CPC ........ B09B 5/00; B65F 1/1405; B65F 1/1473; B65F 2210/128; B65F 2210/184;
(Continued)

(56) References Cited

U.S. PATENT DOCUMENTS 3,499,500 A  *  3/1970  Harding .............. G01G 3/1406
                                                177/136
3,880,072 A  *  4/1975  Ord ...................... B30B 15/041
                                                100/100
(Continued)

FOREIGN PATENT DOCUMENTS

CA      2788515       2/2014
EP      0508753       10/1992
(Continued)

OTHER PUBLICATIONS

WasteCare Corporation, "60" Vertical Balers Comparison Chart," accessed by Web Archive on Aug. 13, 2010, 5 pages.
(Continued)

*Primary Examiner* — Randy W Gibson
(74) *Attorney, Agent, or Firm* — Gardner Groff & Greenwald, PC

(57) ABSTRACT

A weight-measurement system for inclusion or use with a waste container includes scale devices in communication with a remote computer via a communications module. In some embodiments, the scale devices are mounted to a wheeled base frame that is integral with and supports the waste container. In other embodiments, the scale devices are mounted to a stationary base frame upon which a conventional waste container is retrofittingly positioned and supported during use. The scale devices can be provided by load cells, for example load-pin load cells used as axles for wheels of the integral base frame or as axles for rollers of the retrofit stationary base frame. The remote computer can be programmed to receive weight data from the scale devices, via the communications module, determine the actual weight of the waste contained in the waste container, and provide pre-defined weight-based notifications.

20 Claims, 21 Drawing Sheets

Related U.S. Application Data which is a continuation-in-part of application No. 13/690,574, filed on Nov. 30, 2012, now Pat. No. 10,377,518.

(60) Provisional application No. 62/319,868, filed on Apr. 8, 2016.

(51) Int. Cl.
| | | |
|---|---|---|
| *B65F 1/14* | (2006.01) | |
| *B09B 5/00* | (2006.01) | |
| *B30B 15/00* | (2006.01) | |

(52) U.S. Cl.
CPC ........... *B65F 1/1473* (2013.01); *G01G 23/18* (2013.01); *B30B 15/00* (2013.01); *B65F 2210/128* (2013.01); *B65F 2210/184* (2013.01)

(58) Field of Classification Search
CPC ...... B30B 15/00; G01G 19/022; G01G 23/18; G01G 3/12; G01G 3/1408; G01G 19/12; G01G 3/14
See application file for complete search history.

(56) References Cited

U.S. PATENT DOCUMENTS

| | | | |
|---|---|---|---|
| 3,893,386 A | 7/1975 | Wise | |
| 4,095,660 A * | 6/1978 | Johansson | G01L 1/2225 177/136 |
| 4,478,091 A * | 10/1984 | Forrester | B60G 11/12 177/136 |
| 4,516,646 A * | 5/1985 | Bergfalk | G01L 1/2225 177/211 |
| 4,694,921 A * | 9/1987 | Johnston | G01G 19/12 177/136 |
| 4,728,241 A * | 3/1988 | Edelhoff | B65F 63/004 414/392 |
| 4,742,880 A | 5/1988 | Schrag et al. | |
| 4,773,027 A | 9/1988 | Neumann | |
| 5,016,197 A | 5/1991 | Neumann et al. | |
| 5,174,198 A | 12/1992 | Bolstad | |
| 5,350,493 A | 9/1994 | Nguyen | |
| 5,384,436 A | 1/1995 | Pritchard | |
| 5,742,010 A | 4/1998 | Griffin | |
| 6,155,769 A * | 12/2000 | Robinson | B60P 1/6445 248/143 |
| 6,360,186 B1 | 3/2002 | Durbin | |
| 6,378,276 B1 | 4/2002 | Dorge et al. | |
| RE38,233 E * | 8/2003 | Vande Berg | G01G 19/18 177/145 |
| 6,769,315 B2 * | 8/2004 | Stevenson | G01G 19/12 73/794 |
| 7,146,294 B1 | 12/2006 | Waitkus | |
| 7,511,234 B1 * | 3/2009 | Ebinger | G01G 19/021 177/132 |
| 7,683,274 B2 * | 3/2010 | Dellac | G01L 5/0004 177/211 |
| 8,238,898 B2 * | 8/2012 | Lerner | G01G 23/3742 455/423 |
| 10,564,029 B2 * | 2/2020 | Waite | B09B 5/00 |
| 2006/0080819 A1 | 4/2006 | Mcallister | |
| 2007/0175341 A1 | 8/2007 | Roberts | |
| 2007/0185612 A1 | 8/2007 | Stevens | |
| 2008/0061125 A1 | 3/2008 | Langlois et al. | |
| 2009/0235628 A1 | 9/2009 | Derstine et al. | |
| 2010/0179912 A1 | 7/2010 | Curotto | |
| 2012/0073456 A1 | 3/2012 | Lyle et al. | |
| 2012/0152133 A1 | 6/2012 | Newsome | |
| 2012/0285750 A1 | 11/2012 | Hynes et al. | |
| 2014/0122347 A1 | 5/2014 | Moran et al. | |
| 2016/0356640 A1 | 12/2016 | Freeman | |

FOREIGN PATENT DOCUMENTS

| | | |
|---|---|---|
| EP | 0967320 | 12/1999 |
| GB | 1507800 | 4/1978 |
| JP | 2000142657 | 5/2000 |
| KR | 100252464 | 4/2000 |
| WO | 2009044092 | 4/2009 |

OTHER PUBLICATIONS

Green Recycling, "Services—Recycling Card/Cardboard/OGG (Old Corrugated Cardboard)," accessed by WebArchive on Jun. 18, 2012, 4 pages.

Pandora Intelligent Networks <http://www.pandoraintelligentnetworks.com/about.aspx> Retrieved Mar. 18, 2019, 1 page.

Marathon Equipment Company, "RamJet Compactor Options," at least as early as Apr. 8, 2016, 8 pages.

\* cited by examiner

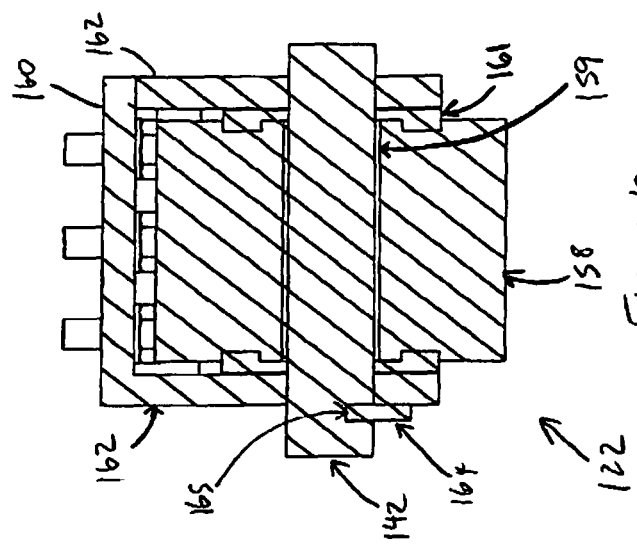
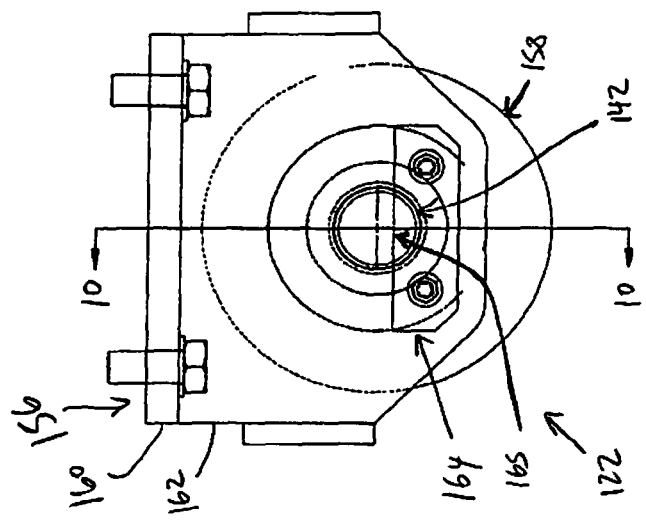

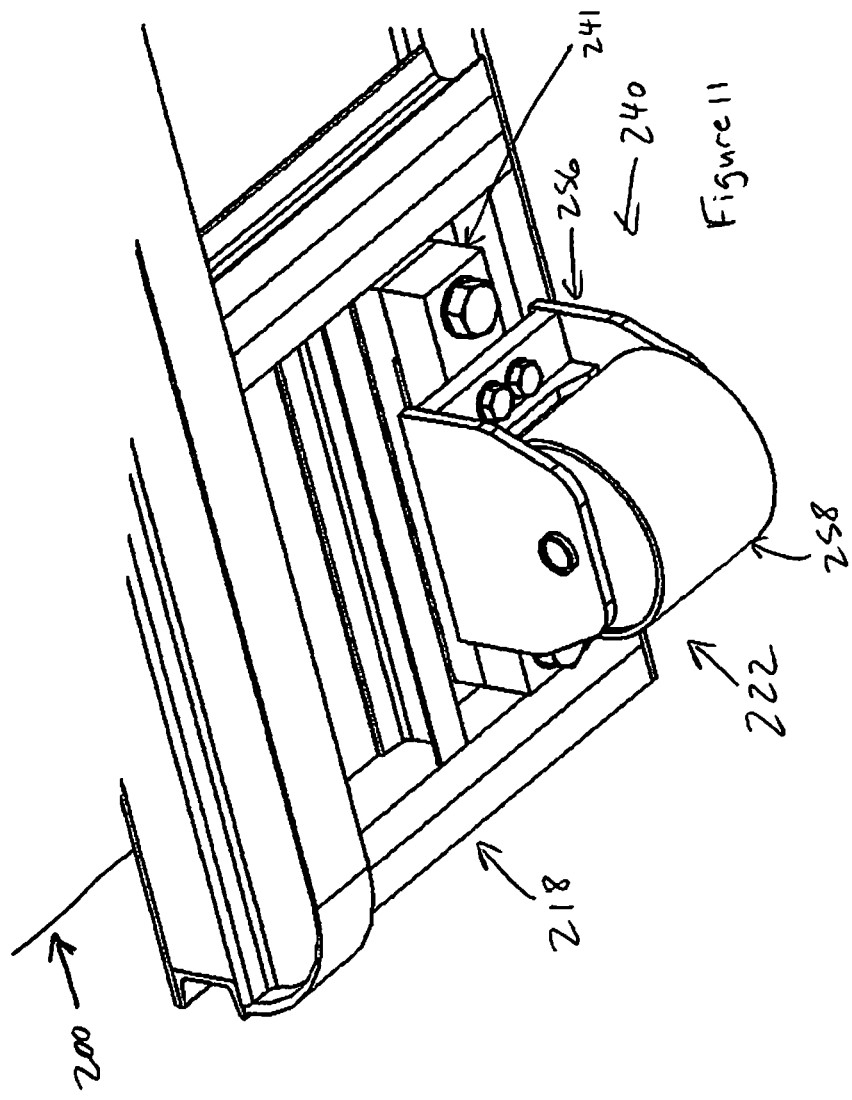

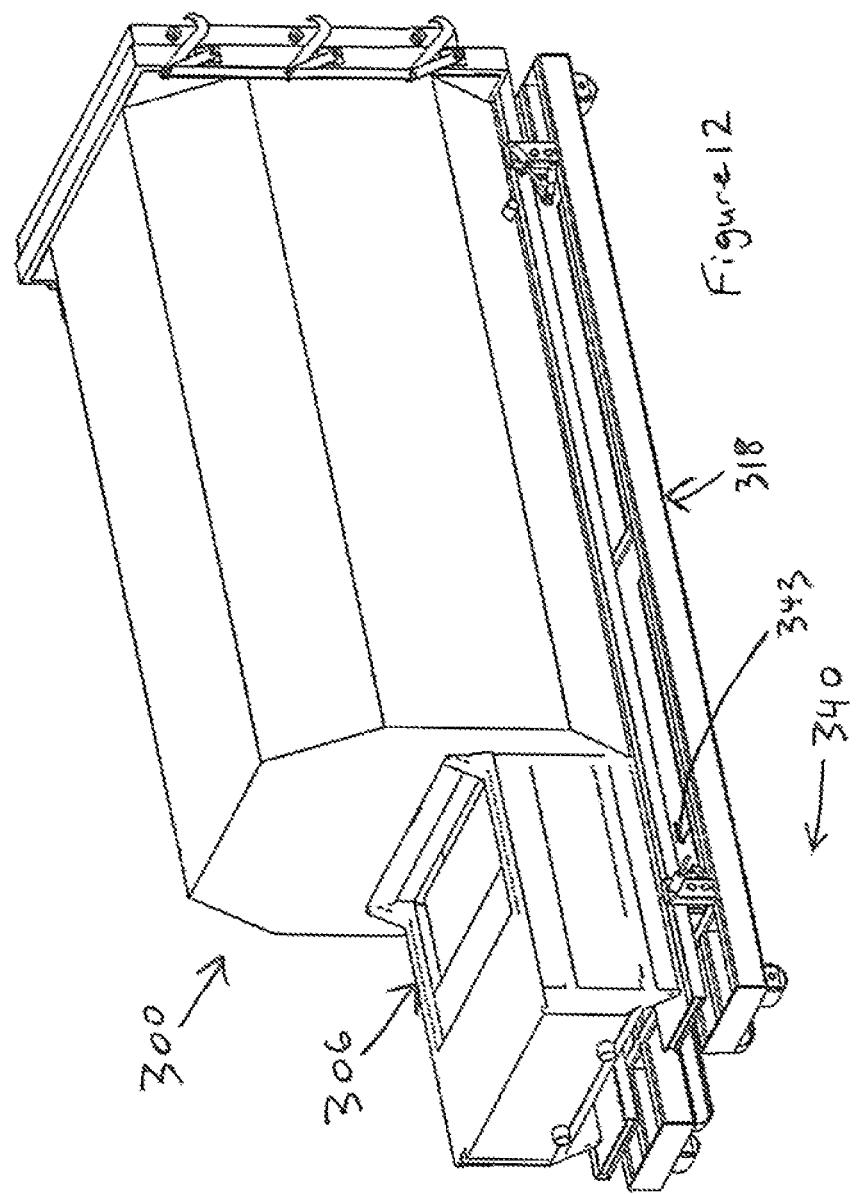

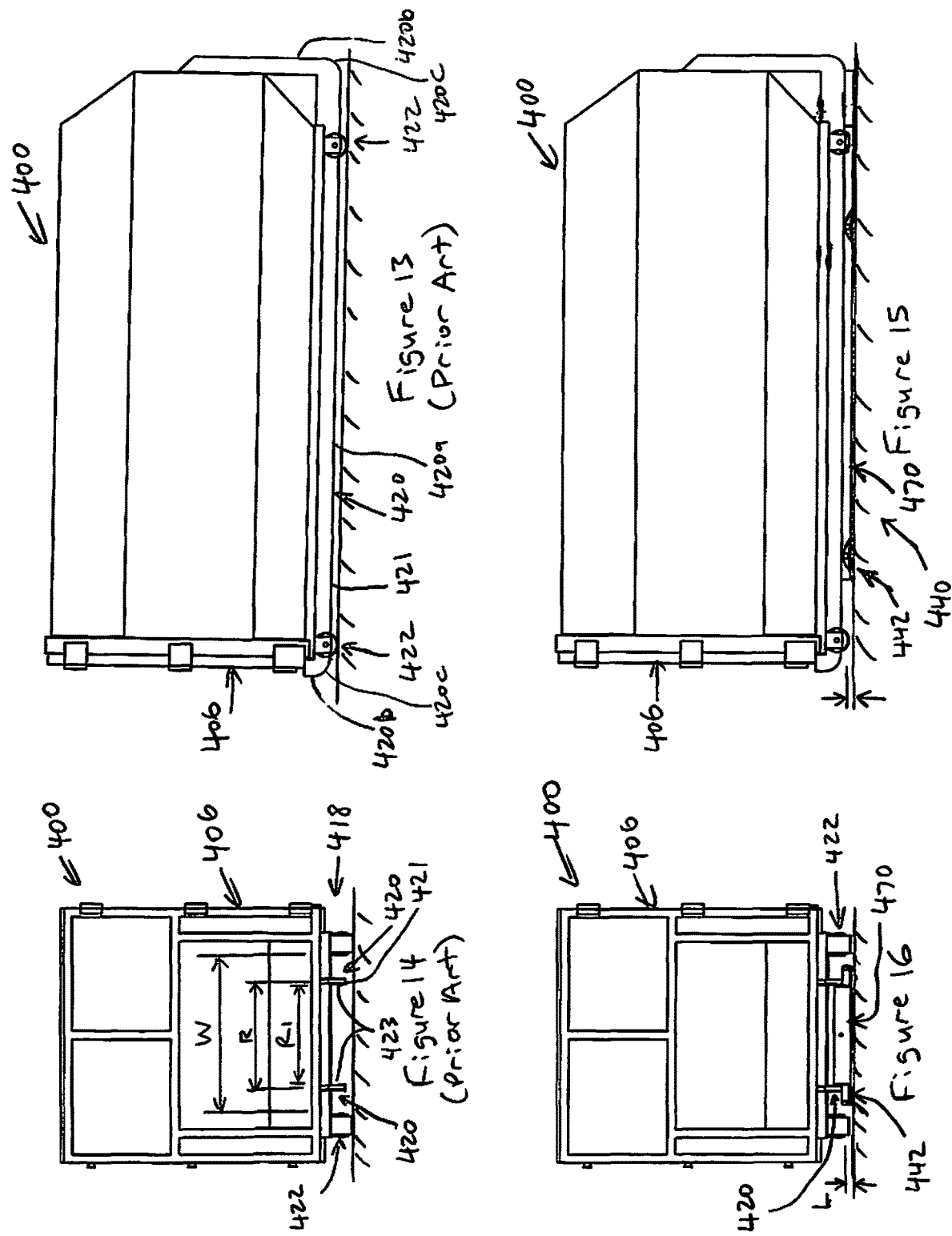

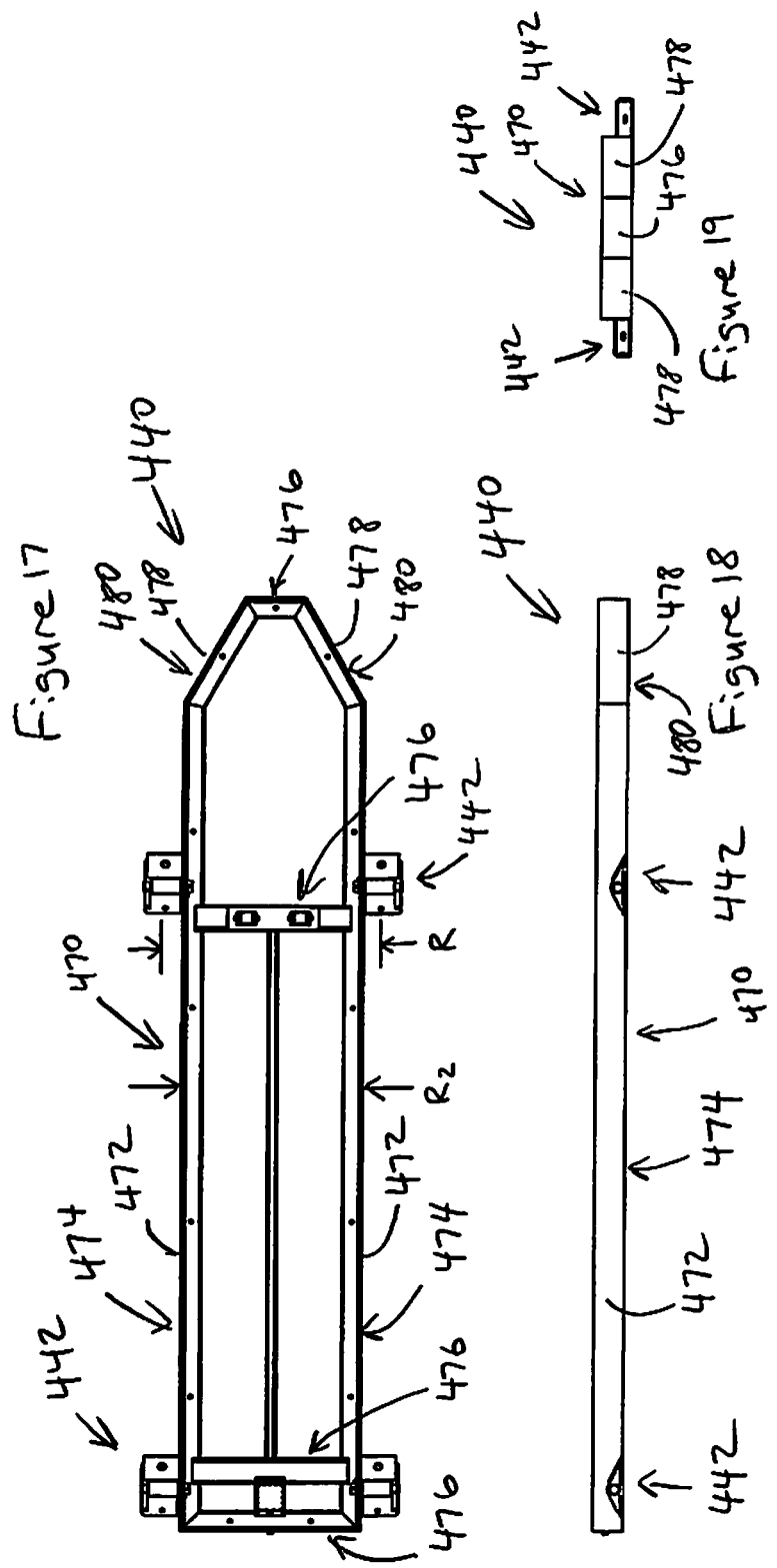

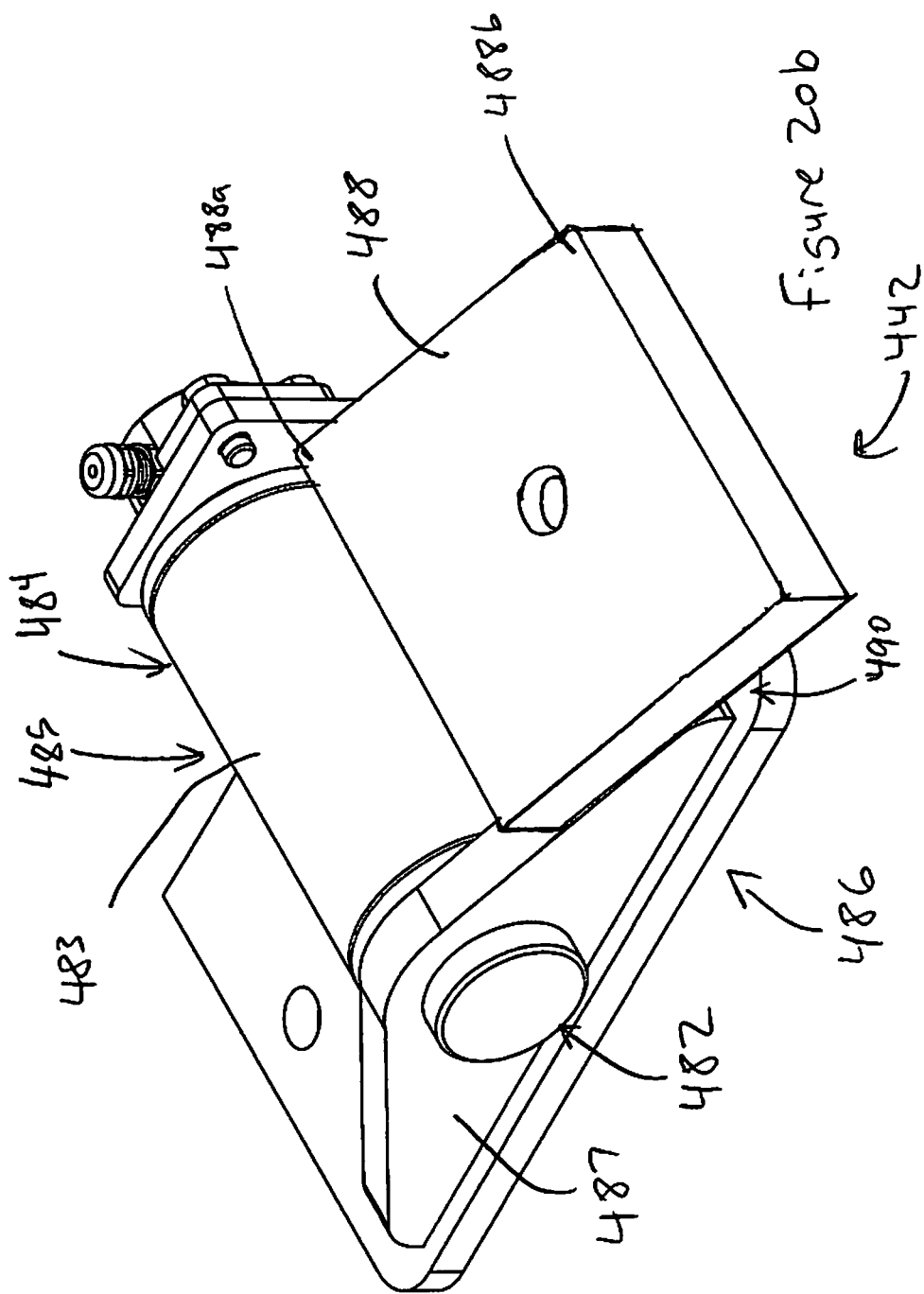

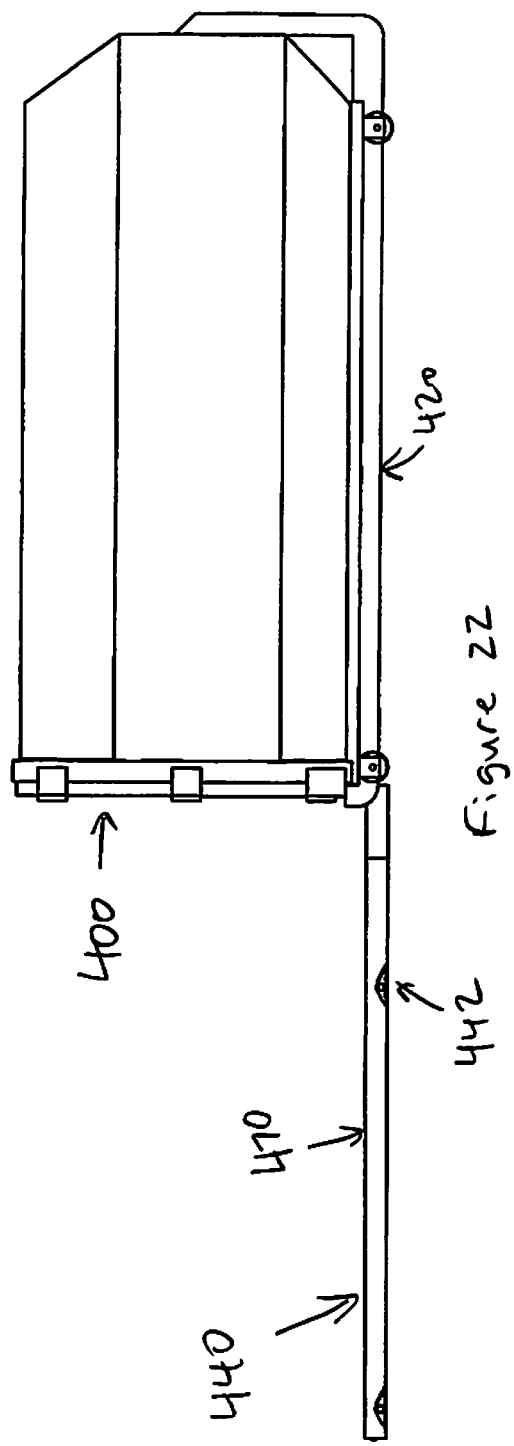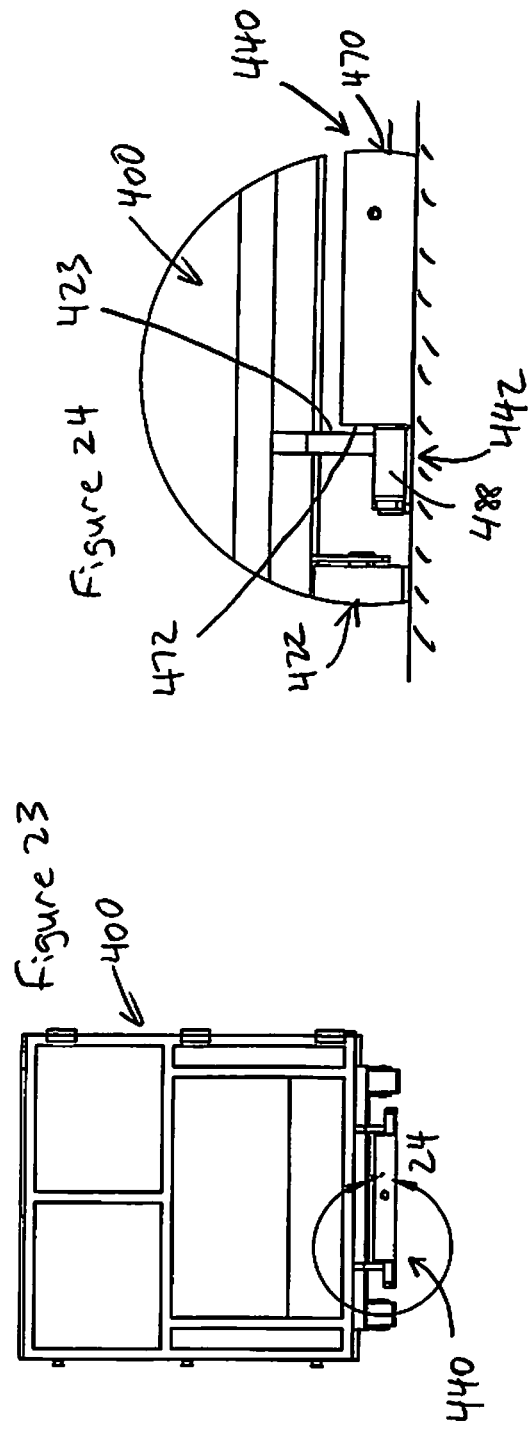

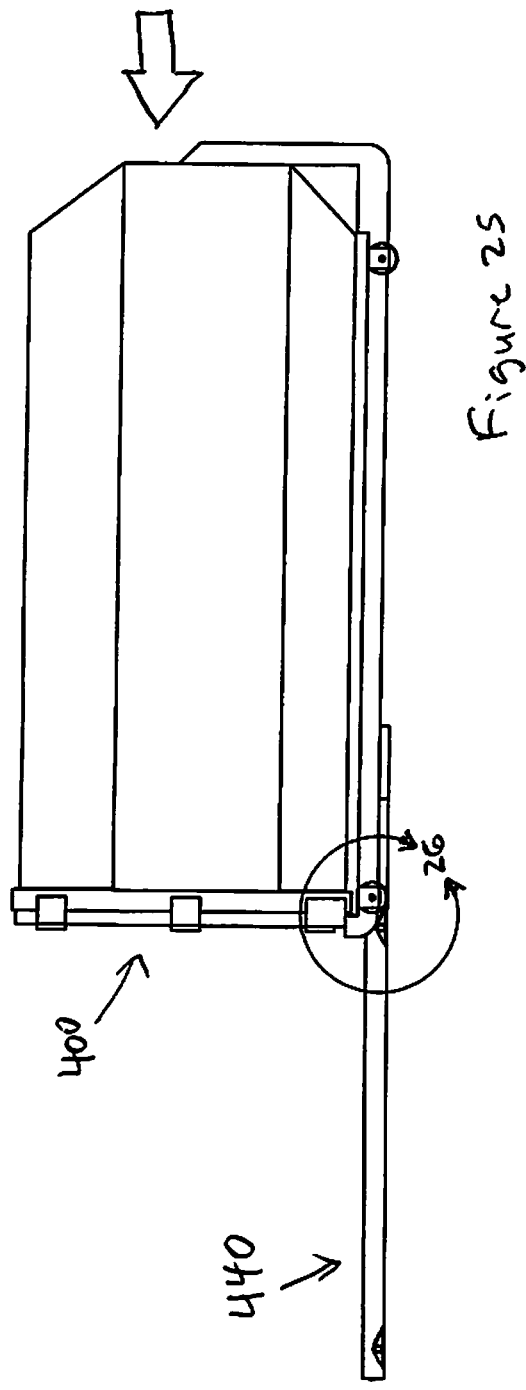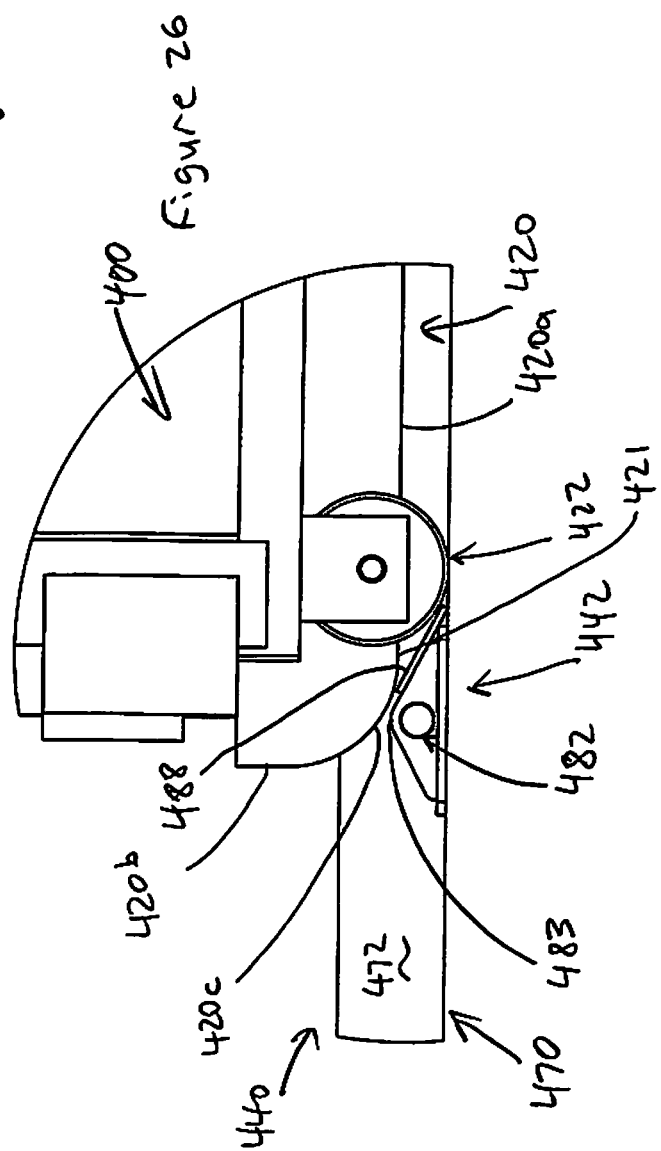

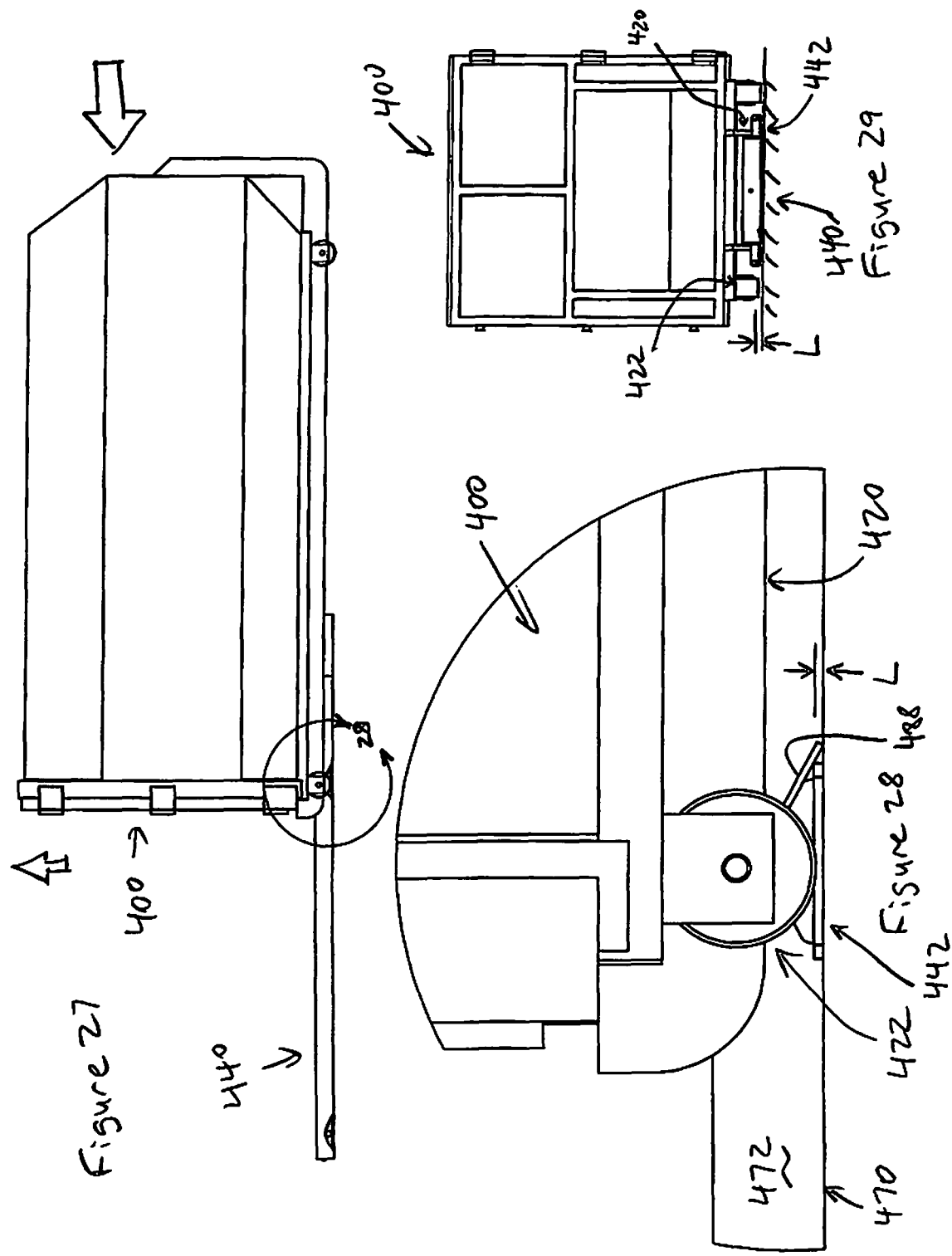

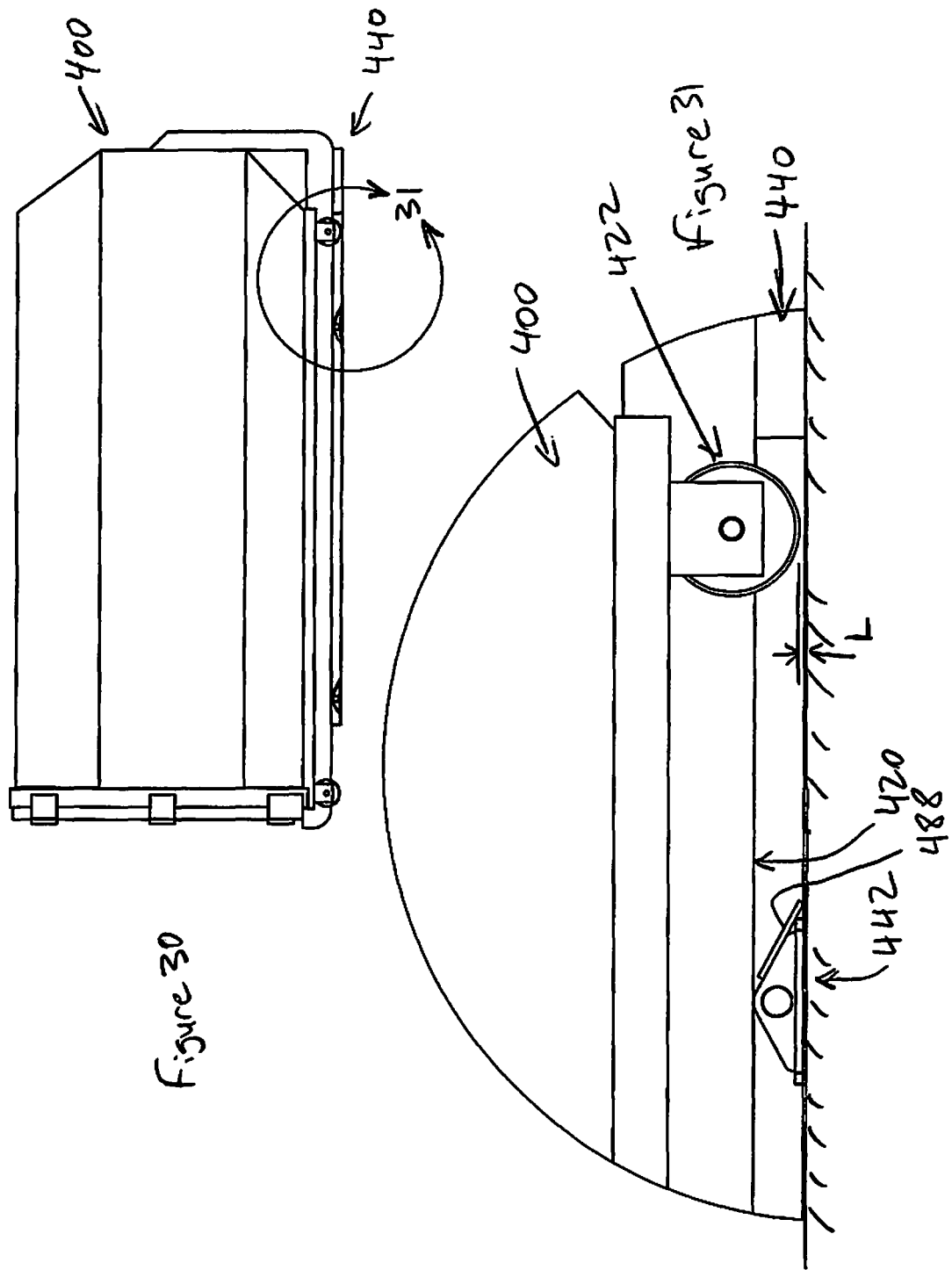

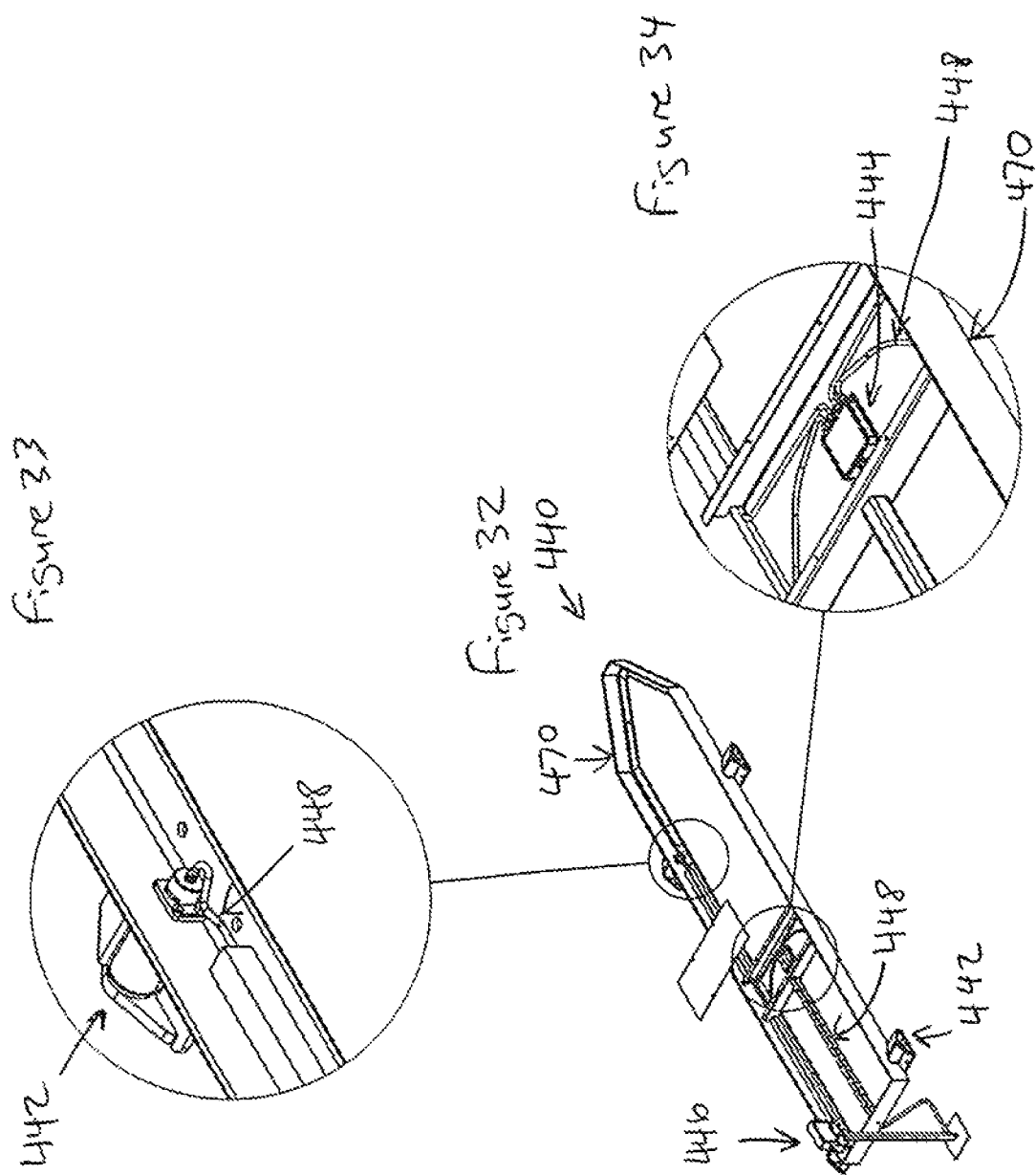

WEIGHT-MEASUREMENT RETROFITTING FOR WASTE COMPACTORS

CROSS-REFERENCE TO RELATED APPLICATIONS

This application is a continuation-in-part of U.S. Non-Provisional patent application Ser. No. 15/483,816, filed Apr. 10, 2017, which claims the priority benefit of U.S. Provisional Patent Application Ser. No. 62/319,868, filed Apr. 8, 2016, and which is a continuation-in-part of U.S. Non-Provisional patent application Ser. No. 13/690,574, filed Nov. 30, 2012, all of which are hereby incorporated herein by reference.

TECHNICAL FIELD

The present invention relates generally to equipment for containing waste, and particularly to waste-containing equipment for monitoring the contained waste for timely emptying thereof.

BACKGROUND

Waste containers are commonly used to store rubbish until they can be emptied and their contents hauled away by a garbage truck or other waste-collection vehicle. Such waste containers include large-scale mechanized equipment (such as compactors, balers, etc.) and non-mechanized units (dumpsters, open-tops, recycling containers, etc.). These waste containers are commonly used at many types of sites, such as industrial facilities, commercial buildings, apartment buildings, construction sites, and so forth. And these waste containers are commonly used to store all types of waste, including corrugated cardboard; paper; objects or scraps of plastic, nonferrous metals (e.g., aluminum), glass, and/or other recyclable materials; food waste; yard waste; building-material waste; and other dry and wet waste.

There are tremendous monies associated with the disposal and/or selling of the waste (recyclable and non-recyclable) materials. For some situations, the weight of the waste material is used to determine disposal fees or selling prices (e.g., by haulers as well as by landfills or recyclers). And for some situations, there are "tipping" charges for regularly scheduled (e.g., weekly) emptying of the waste containers. So systems have been developed in an effort to determine the weight of the waste and/or the fullness of the waste container to thereby provide more transparency in these financial transactions (disposal and/or selling), to avoid excessive tipping charges (from premature emptying), and/or to avoid fines for weight overages when hauling away. However, known measuring systems have drawbacks, for example weight measurements that can be insufficiently accurate (estimates converted from fullness measurements), external components and attachment positions that can cause interference issues, limited retrofit capabilities, and/or too-high costs.

Accordingly, it can be seen that needs exist for better ways of measuring waste in waste containers. It is to the provision of solutions to this and other problems that the present invention is primarily directed.

SUMMARY

Generally described, the present invention relates to a weight-measurement system for inclusion or use with a waste container. The weight-measurement system includes scale devices in communication with a remote computer via a communications module. The remote computer can be programmed to receive from the scale devices, via the communications module, weight data representing the total weight of the waste container and its waste contents, then deduct the known weight of the waste container when empty, to determine the actual weight of the waste contained in the waste container. And the computer can be programmed for providing a notification if a preset waste weight limit is met or neared and automatically scheduling emptying by a waste-collection vehicle.

In some embodiments, the weight-measurement system is integrated into the waste container, for example with the scale devices mounted to a wheeled base frame that is integral with and supports the waste container. In other embodiments, the weight-measurement system is provided separately from, and for retrofit use with, an existing conventional waste container, for example with the scale devices mounted to a stationary base frame upon which the conventional waste container is retrofittingly positioned and supported during use. The scale devices can be provided by load cells, for example load-pin load cells used as axles for wheels of the integral base frame or as axles for rollers of the retrofit stationary base frame.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 9 is a side view of the wheel assembly of FIG. 5.

FIG. 10 is a cross-sectional side view of the wheel assembly of FIG. 9 taken at line 10-10.

FIG. 11 is a perspective view of a portion of a waste container system outfitted with a weight-measurement system according to a second example embodiment of the present invention.

FIG. 12 is a perspective view of a portion of a waste container system outfitted with a weight-measurement system according to a third example embodiment of the present invention.

FIG. 13 is a side view of a prior-art waste container that can be used with a retrofit weight-measurement system according to a fourth example embodiment of the present invention.

FIG. 14 is an end view of the prior-art waste container of FIG. 13.

FIG. 15 is a side view of a retrofit weight-measurement system according to the fourth example embodiment of the present invention, shown in use with the prior-art waste container of FIG. 13.

FIG. 16 is an end view of the weight-measurement system and the waste container of FIG. 15.

FIG. 17 is a plan view of the weight-measurement system of FIG. 15.

FIG. 18 is a side view of the weight-measurement system of FIG. 17.

FIG. 19 is an end view of the weight-measurement system of FIG. 17.

FIGS. 20a-20b are perspective views of scale devices of the weight-measurement system of FIG. 17.

FIG. 22 is a side view of the weight-measurement system and the waste container of FIG. 21.

FIG. 23 is an end view of the weight-measurement system and the waste container of FIG. 22.

FIG. 24 shows the detail marked 24 of the weight-measurement system and the waste container of FIG. 23.

FIG. 25 shows the weight-measurement system and the waste container of FIG. 22 with the waste container moved onto the weight-measurement system and the scale devices about to be engaged.

FIG. 26 shows the detail marked 26 of the weight-measurement system and the waste container of FIG. 25.

FIG. 27 shows the weight-measurement system and the waste container of FIG. 25 with the waste container moved farther onto the weight-measurement system and the scale devices now engaged.

FIG. 28 shows the detail marked 28 of the weight-measurement system and the waste container of FIG. 27.

FIG. 29 is an end view of the weight-measurement system and the waste container of FIG. 27.

FIG. 30 shows the weight-measurement system and the waste container of FIG. 27 with the waste container moved fully onto the weight-measurement system to a use position with the scale devices now fully engaged and fully supporting the waste container.

FIG. 31 shows the detail marked 31 of the weight-measurement system and the waste container of FIG. 30.

FIG. 32 is a perspective view of the weight-measurement system of FIG. 15, showing details of the control/communication system.

FIG. 33 is a perspective detail view of a portion of the weight-measurement system of FIG. 32, showing details of the control/communication system.

FIG. 34 is a perspective detail view of a portion of the weight-measurement system of FIG. 32, showing details of the control/communication system.

DETAILED DESCRIPTION OF EXAMPLE EMBODIMENTS

Figure 1:
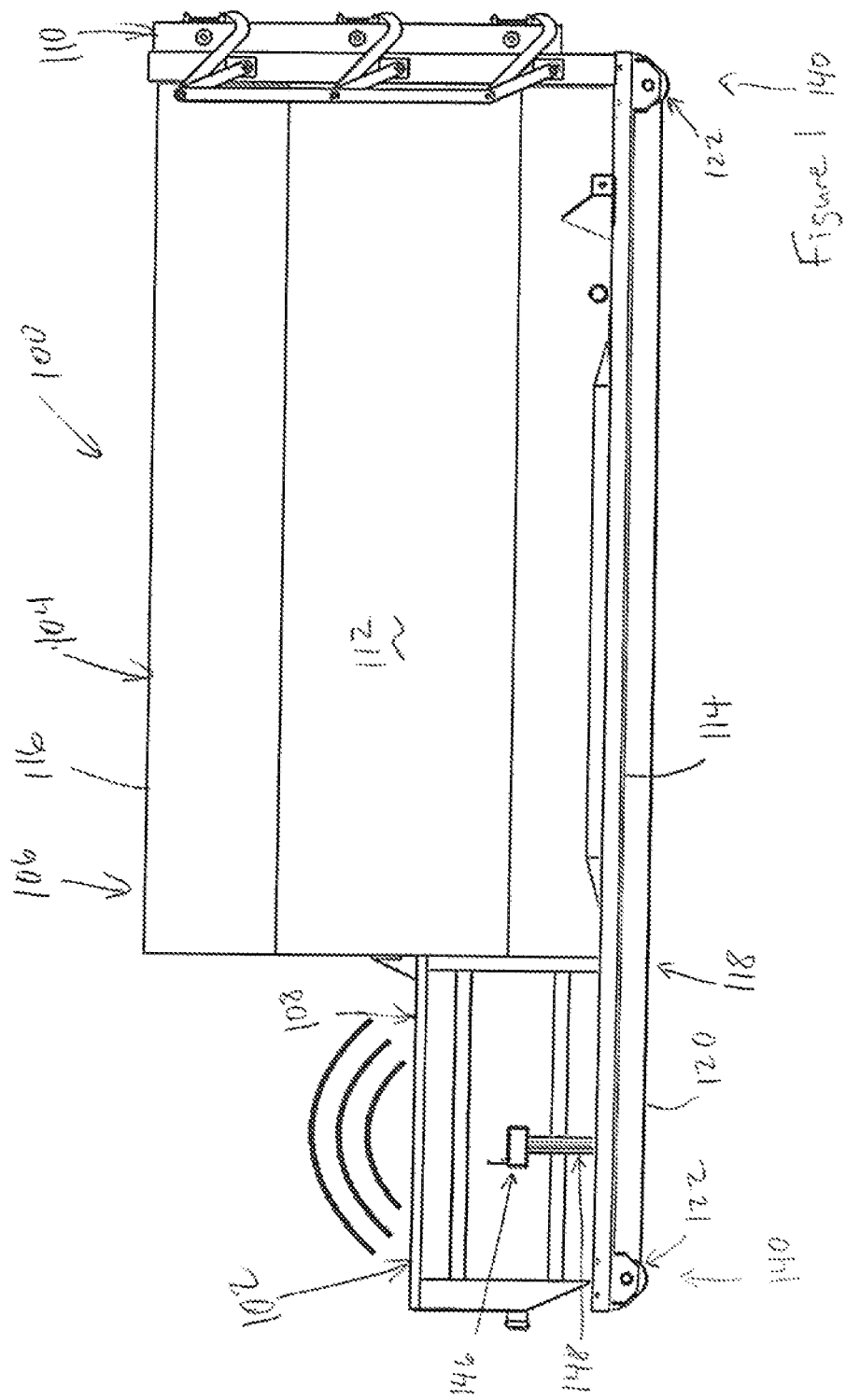
FIG. 1 is a side view of a waste container system outfitted with a weight-measurement system according to a first example embodiment of the present invention.
Figure 2:
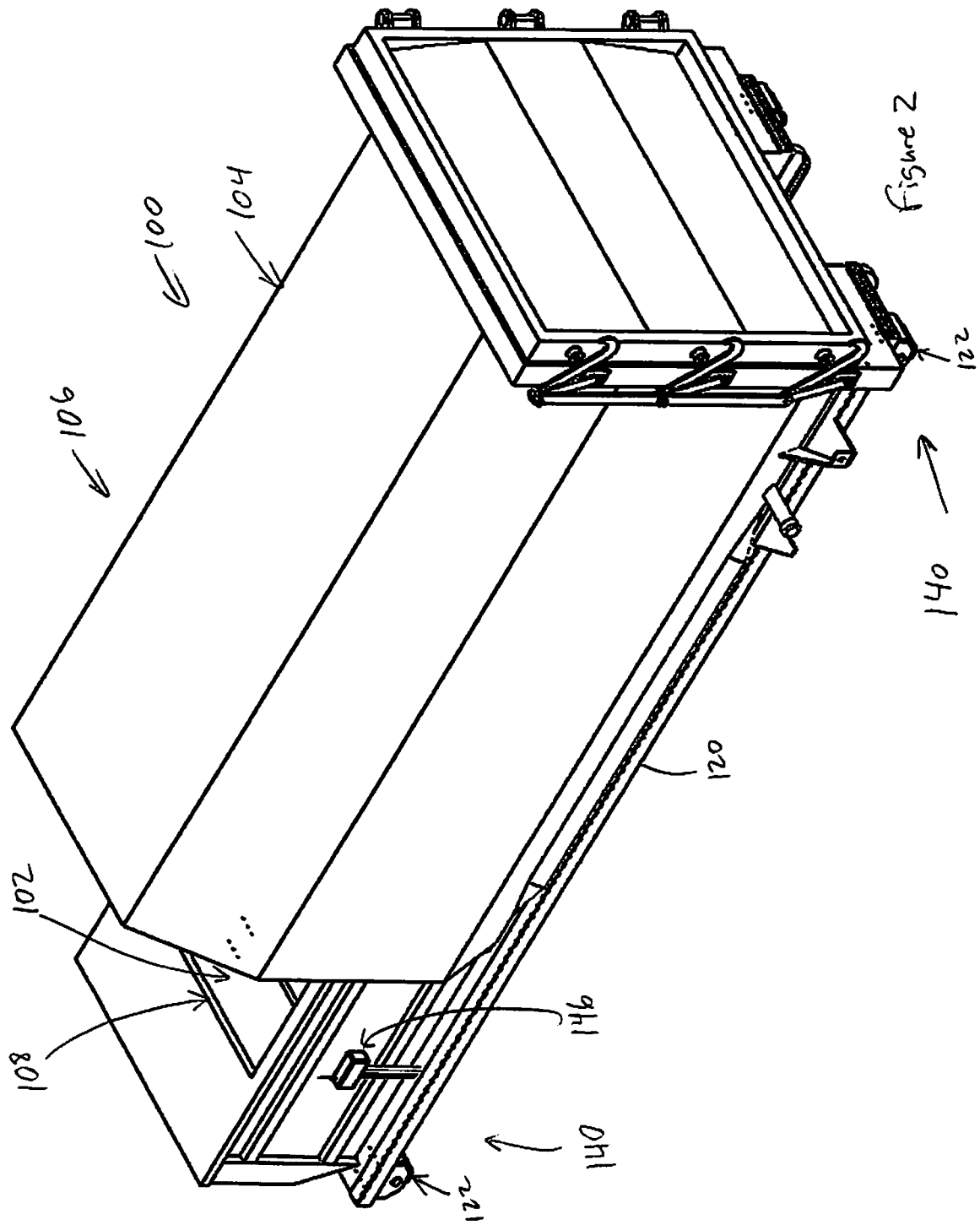
FIG. 2 is a perspective view of the waste container and weight-measurement system of FIG. 1.
Figure 3:
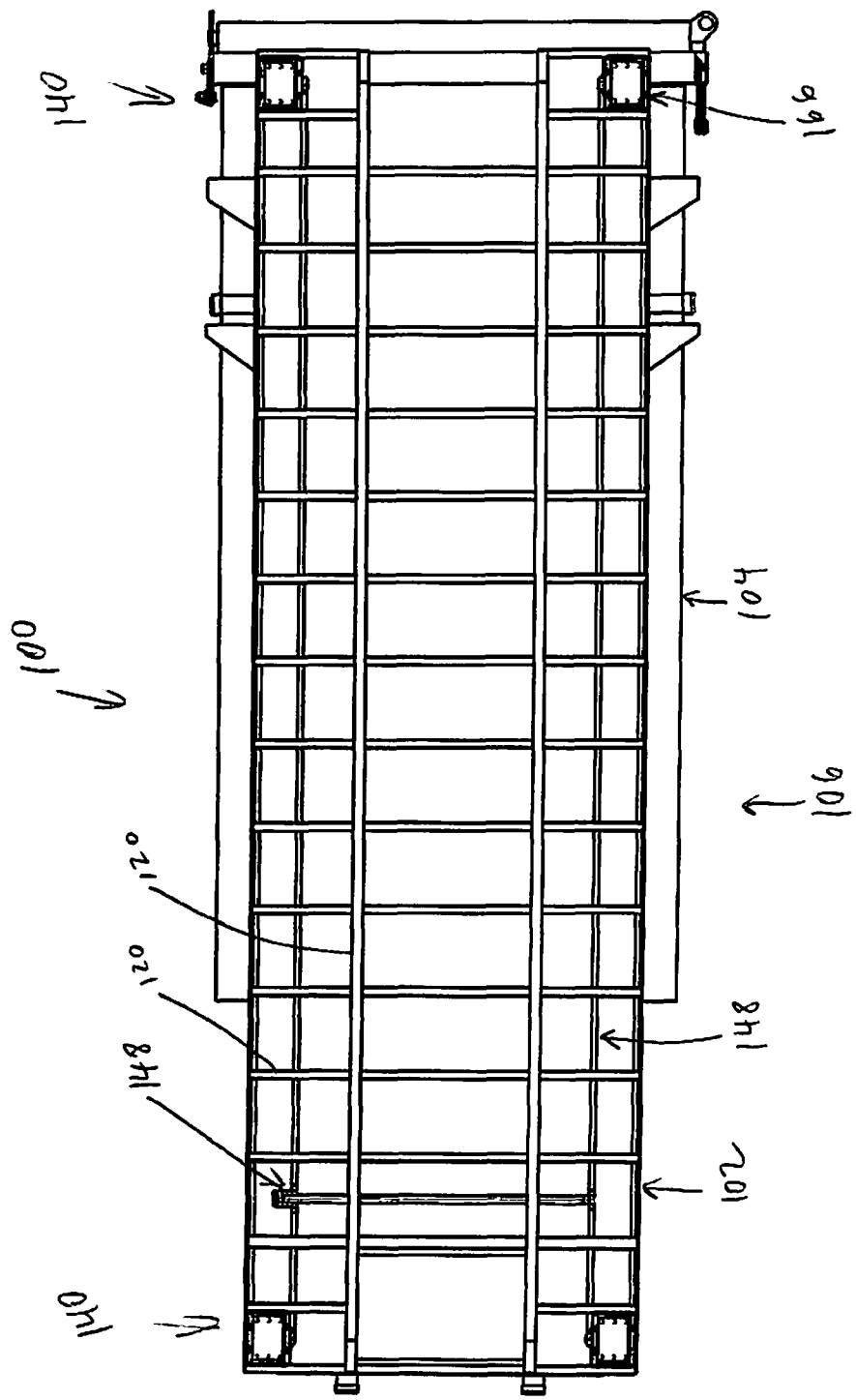
FIG. 3 is a bottom view of the waste container and weight-measurement system of FIG. 1 without wheel assemblies.

The present invention generally relates to a scaling system that can be used in the waste and recycling sector to weigh the waste contents of a waste container. As used herein, the term "waste" is broadly intended to include recyclable and non-recyclable materials, and the term "waste container system" is broadly intended to include large-capacity commercial/industrial mechanized and non-mechanized units such as compactors, recycling dumpsters, etc., as identified in the background section above. Also, any dimensions disclosed in this or any related application are representative of a typical commercial embodiment and are provided for illustration purposes only, and thus are not limiting of the invention.

FIGS. 1-10 show a waste container system 100 outfitted with a weight-measurement system 140 according to a first example embodiment of the invention. The weight-measurement system 140 can be used to accurately weigh the waste container 100. The weight-measurement system 140 does this by utilizing the waste container 100 as a scale base/platform for supporting the waste material that is being weighed. With the weight of the waste container 100 when empty being a predetermined/known fixed value, and with the weight of the waste container when containing waste being accurately determinable by the weight-measurement system 140, the weight of the waste contents can be accurately determined.

Referring particularly to FIGS. 1-4, the waste container system 100 that the weight-measurement system 140 can be used with may be of any conventional type such as the depicted large-capacity self-contained compactor. In the depicted embodiment, the compactor-type waste container 100 includes a charge chamber 102 that initially receives the waste materials (not shown) to be compacted and a compacting chamber 104 in which the received waste materials are compacted and stored. The charge chamber 102 and the compacting chamber 104 together form a unitary compacting/storage container 106 (also referred to as the "can"). A charge opening 108 at one end of the overall container 106 provides insertion access to the charge chamber 102 and a hinged dump door 110 at the opposite end of the overall chamber provides removal access to the compacting chamber 104. The compacting/storage container 106 includes left and right sidewalls 112 and a bottom wall 114 extending the full container length, and a top wall 116 extending the compacting chamber 104 length.

A powered compacting mechanism (not shown) typically includes a hydraulically operated ram that moves horizontally within the overall container 106 from the charge chamber 102 toward the compacting chamber 104. A compaction control system (not shown) includes conventional control components and connections for safely operating the hydraulic ram. Also, options for the waste container 100 typically include dog houses, hoppers, and/or chutes for feeding the waste into the charge chamber 104.

A base frame 118 includes support rails 120 and a plurality (e.g., typically four, optionally six or more) of wheel assemblies 122 to support and enable easy movement of the compacting/storage container 106. The support rails 120 can form a lattice or grid structural framework, as depicted, and a plate or panel can be mounted over this and be separate from or serve as the bottom wall of the waste container. In the depicted embodiment, the compacting/storage container 106 and the base frame 118 are attached together to form an integral unit. In other embodiments, the compacting/storage container is removably mounted on the wheeled base frame so that it can be removed for emptying while the wheeled base frame (and at least the weight-measurement scale devices of the weight-measurement system 140 mounted to it) remains onsite.

In use, waste materials are fed into the charge chamber 102 through the charge opening 108. The waste materials are then pushed toward the compacting chamber 104, and are compacted therein, by the hydraulic ram. The compacted waste then remains stored within the compacting chamber 106, preferably until the compacting chamber is substantially completely filled with compacted waste materials. The waste container 100, along with the compacted/stored waste therein, is then hauled to a collection and/or waste disposal facility where the compacted waste is dumped or otherwise removed from the compacting/storage container 106 for example through the dump door 110.

Such compactor waste container systems 100 are commercially available from numerous suppliers, including BACE, LLC (Charlotte, N.C.). As the waste container 100 can be of such a conventional type, and additional structural and operational details are not needed for a complete understanding of the invention, such additional details are excluded for brevity.

The weight-measurement system 140 can be used to weigh the waste contents of the waste container system 100. The weight-measurement system 140 for each the waste container 100 includes a plurality of scale devices 142 for weight sensing and a communications system 144 that includes a communications module 146 to which the scale devices are operably connected. In the depicted embodiment, for example, the scale devices 142 are connected to the communications module 146 by wiring 148 such as a control cable and an electric power cable routed along and attached to the compacting/storage container 106. This wiring 148 can be bundled together with hydraulic lines for the hydraulic ram and connectable to the compaction control unit (not shown, can be integrated with the communications module 146) for the hydraulic ram, or it can run separately from the hydraulic lines. In other embodiments, the scale devices are connected to the communications module by conventional wireless technology, with the scale devices and the communications system each including an antenna and a transmitter or receiver (or transceiver).

Figure 4:
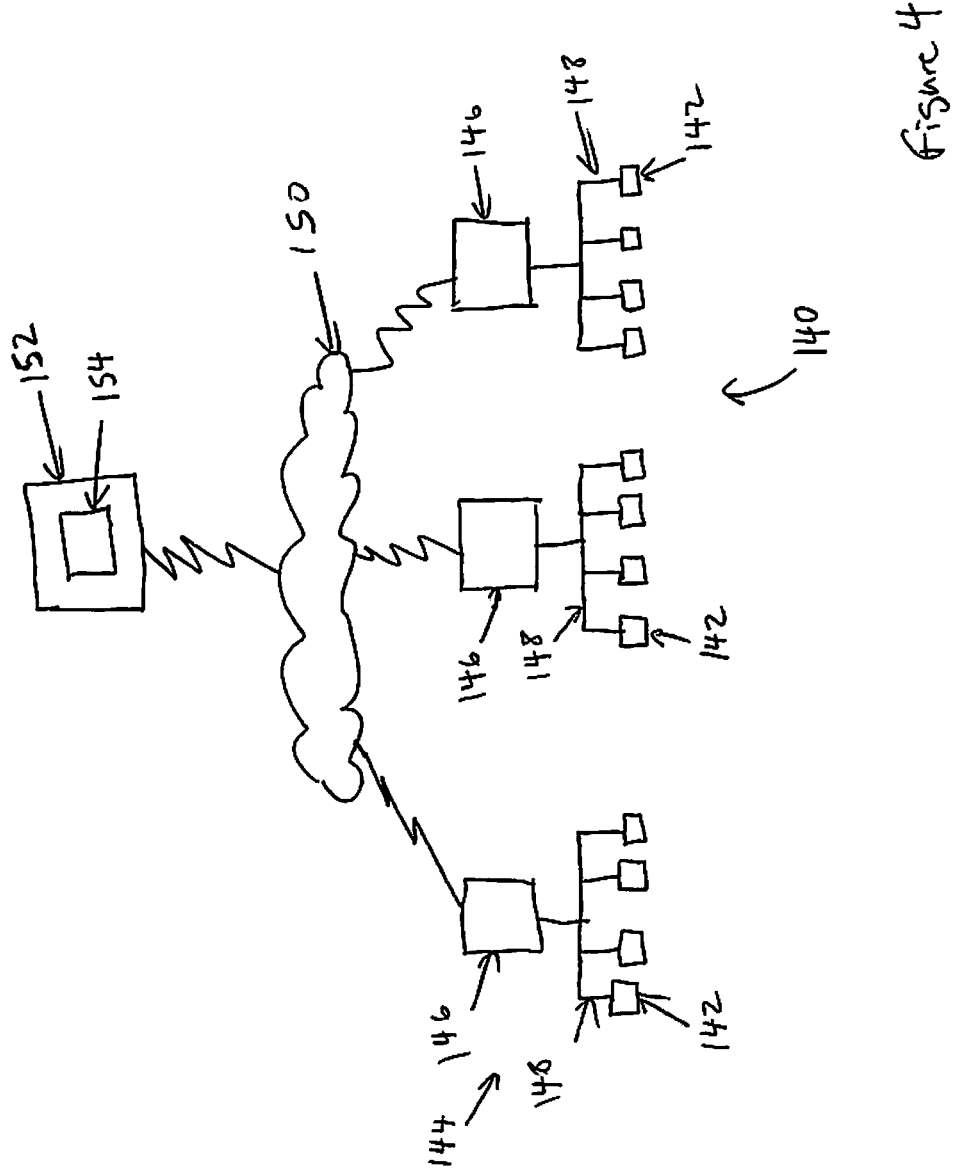
FIG. 4 is a schematic diagram of the weight-measurement system of FIG. 1, including scale devices and communications systems.
Figure 5:
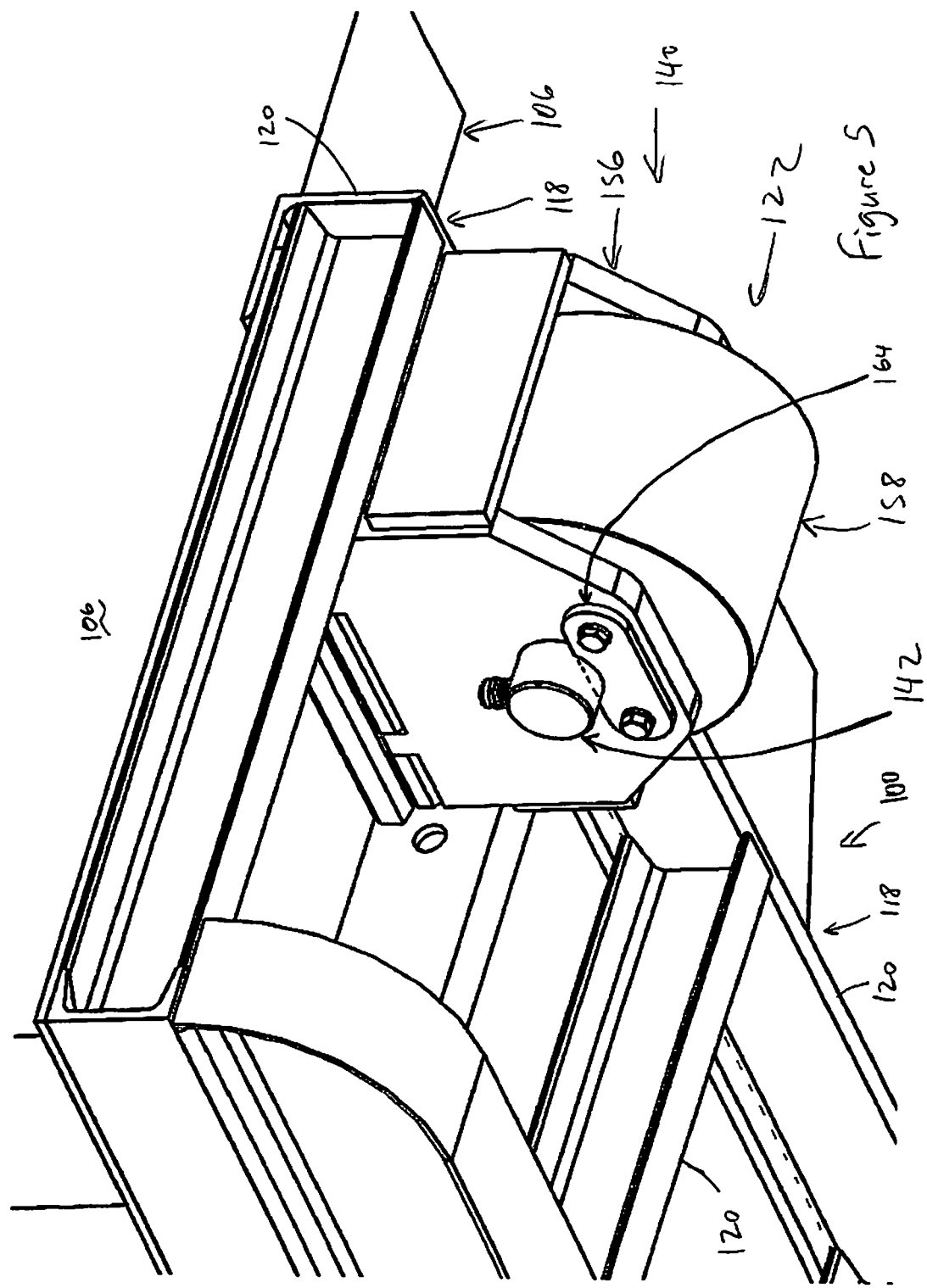
FIG. 5 is a perspective view of a portion of the waste container and weight-measurement system of FIG. 1, showing one of the scale devices as a load cell used as an axle for a wheel assembly of the waste container.
Figure 6:
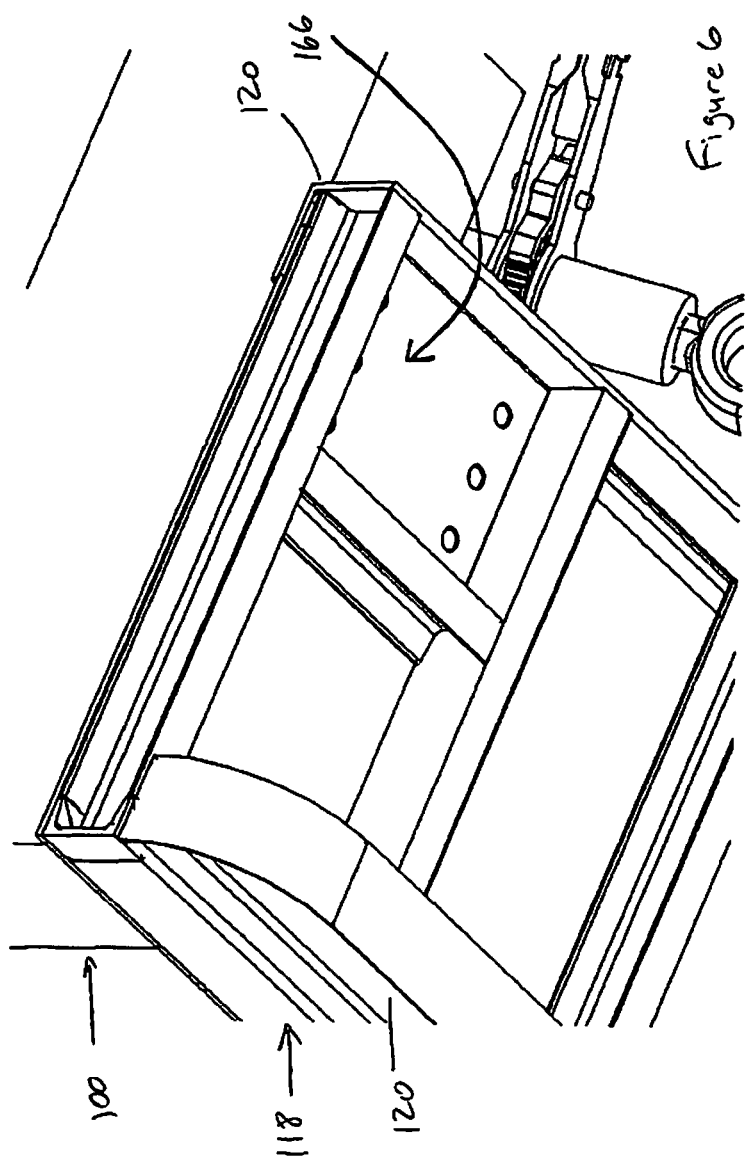
FIG. 6 shows the waste container portion of FIG. 5 without the corresponding wheel assembly mounted to it.
Figure 7:
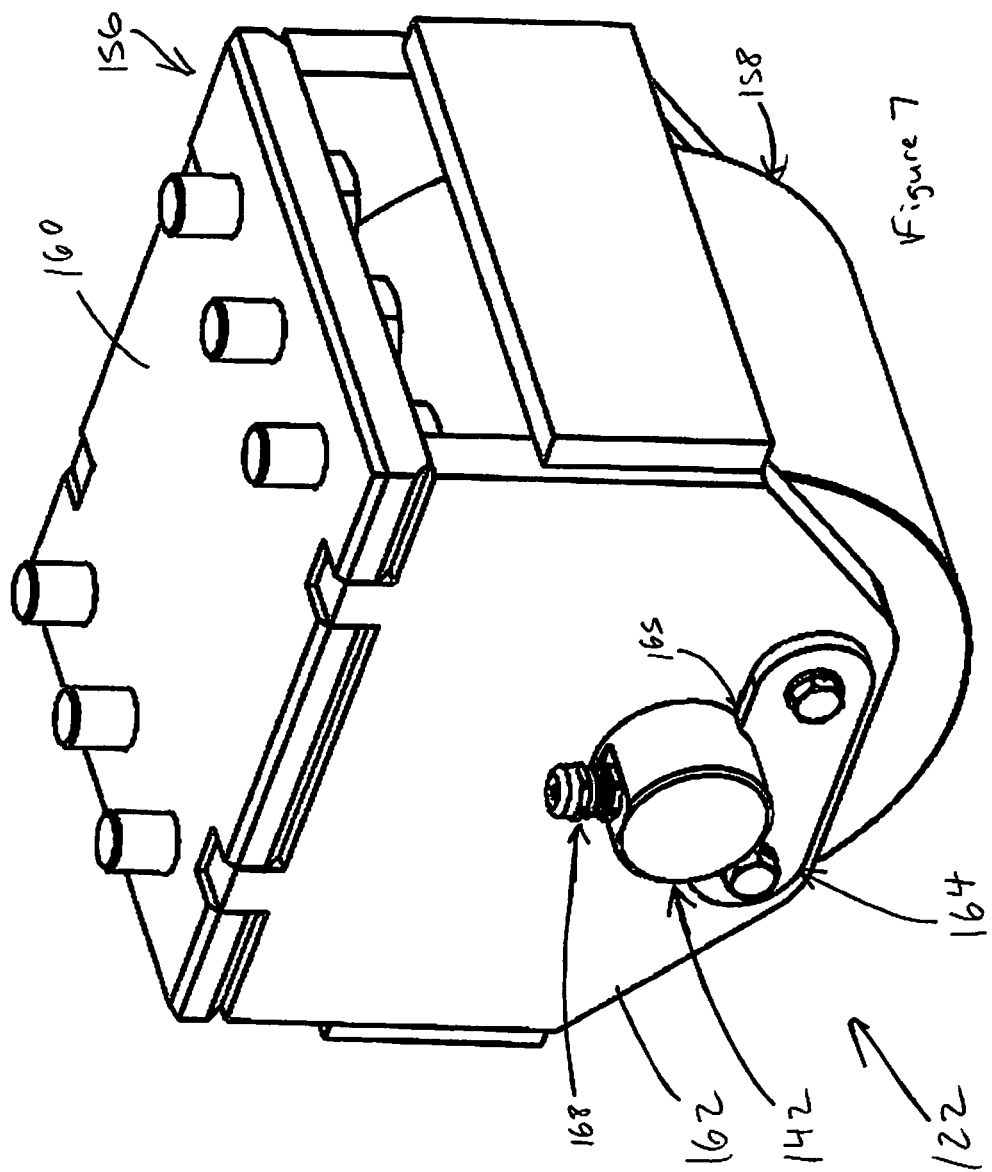
FIG. 7 is a perspective view of the wheel assembly of FIG. 5.
Figure 8:
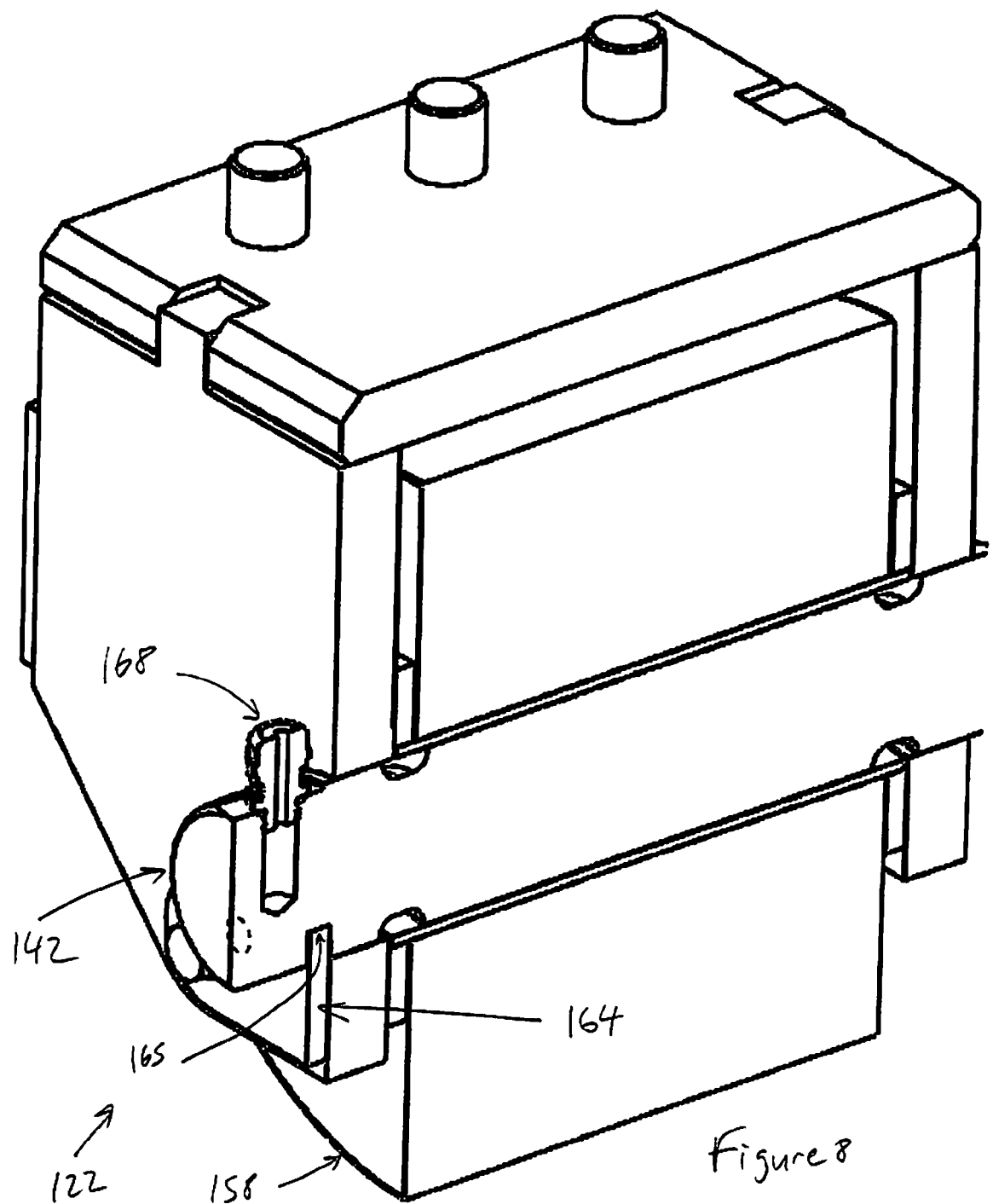
FIG. 8 is a cross-sectional perspective view of the wheel assembly of FIG. 7.

The communications module 146 includes conventional wireless communications components such as an antenna and a transceiver (or just a transmitter in some embodiments for send-only capability) for communicating wirelessly via a wireless communications network 150 (such as the Internet or a cellular system) with a remote computer 152 that runs application software 154 operable to manipulate and display data received from the communications module (see FIG. 4). The communications module 146 can include a power supply (e.g., a battery, solar panel, or electrical connection for receiving power from a nearby source) or be powered by the same power supply as the compaction control unit for the hydraulic ram.

The remote computer 152 includes a non-transitory computer-readable storage device (e.g., a conventional computer memory device) that stores the application software 154 and a processor (e.g., a conventional microprocessor) that executes the instruction sets of the application software 154. The remote computer 152 is operably connected to at least one input device (e.g., a keyboard/keypad and a mouse or other pointing device) and at least one output device (e.g., a monitor or other display screen) for interfacing use by a user. As such, the remote computer 152 can be provided by a conventional desktop, laptop, or tablet computer, or by a smartphone or other handheld mobile electronic device.

In this way, the scale devices 142 measure an indication of the weight of the waste-loaded waste container 100 and communicate that weight data via the communications module 146 to the remote computer 152. And the remote computer 152 and application software 154 receive that weight data and process it to accurately determine the weight of the waste currently present in the waste container 100 and optionally provide additional functionality based thereon.

The programmed computer 152/154 is programmed to determine the weight of the waste present in the waste container 100 at the time by deducting the known weight of the empty waste container from the determined weight of the waste container 100 and its waste contents. The known weight of the empty waste container is a fixed value that can be stored on the storage device on the remote computer 152 and accessed for the particular waste container 100 being monitored. Typically, a range of different types and sizes of waste containers are monitored and serviced, with the different types and sizes of waste containers having different empty weights. So the weight of each type and size of waste container in use is stored, and the particular type and size of the particular waste container at each particular site is stored, then for determining the waste weight the programmed computer 152/154 identifies the type and size of the waste container and looks up the corresponding empty weight to use.

The determined (i.e., measured) weight of the waste container 100 and its waste contents is based on the weight data measured by and received from the scaling devices 142. For example, in typical embodiments with a plurality of the scaling devices 142, the programmed computer 152/154 is programmed to sum the weight data from the scaling devices 142 to determine the total weight of the waste container 100 and its waste contents, then deduct the known weight of the empty waste container to obtain an accurate measurement of the weight of the waste present in the waste container at the time. In the depicted embodiment with four of the scaling devices 142 (one for each wheel assembly 122), the programmed computer 152/154 thus totals the four pieces of weight data to determine the total weight of the waste container 100 and its waste contents. In this embodiment, weight of the waste container 100 and its waste contents, and the known weight of the empty waste container, each include the weight of the supported components of the weight-measurement system 140 (e.g., the communications module 146, wiring 148, and wheel housing 156), and each exclude the weight of the wheels 158 and the axel load cells 142 (these components are detailed below).

In other embodiments with a plurality of the scaling devices 142, the programmed computer 152/154 is programmed to average the weight data measured by and received from the scaling devices 142 (e.g., by totaling the four pieces of weight data then dividing that total by four) for using this average to represent the total weight of the waste container 100 and its waste contents and then deducting a correspondingly averaged empty container weight. And in other embodiments, the communications module 146 includes a microprocessor that performs this weight-determining operation locally and sends the determined waste weight to the remote computer 152.

The determined weight of the waste present in the waste container 100 at the time can then be output to a user (by a display screen, an alarm, etc.) and/or used by the programmed computer 152/154 for performing further functions. For example, the programmed computer 152/154 can be programmed to receive and store a preset weight limit (e.g., in pounds or kilograms) entered by a user, compare the determined waste weight to the preset weight limit, and generate and send alarms, alerts, or other notifications upon the preset weight limit being reached or neared (e.g., notifications can be sent at one or more preset levels such as 70%, 80%, and 90% of the preset limit). The notifications can be for example a message displayed by the remote computer 152 and/or sent electronically to another electronic device.

A notified user can then schedule a pickup (e.g., a waste-collection vehicle sent to the site for emptying the waste container 100) based on this data (e.g., upon the preset weight limit being reached or neared). In some embodiments, the programmed computer 152/154 is programmed for automatically scheduling pickups upon the preset weight limit being reached. To implement this automatic-scheduling functionality, the programmed computer 152/154 includes or interfaces with a scheduling system for a fleet of waste-collection vehicles. In some embodiments, the pickup history (e.g., determined waste weights when scheduling pickup and later at the time of the actual pickup) for each waste container 100 is stored (e.g., on the storage device), the current pickup lead time (e.g., how soon a waste-collection vehicle can be sent) is regularly updated and accessible, and the programmed computer 152/154 is programmed to access this data and based thereon automatically schedule a next pickup for a time when the waste weight is expected to be is very close to but still below the predetermined weight limit.

In addition, the programmed computer 152/154 can be further programmed to remotely disable the waste container 100 once it reaches a predefined maximum capacity (i.e., load limit) beyond which the waste container exceeds transport weight limits. This maximum capacity can additionally or alternatively be predefined based on other factors such as avoiding overloading (e.g., volumetrically or structurally) the waste container 100. In some embodiments, the predefined maximum capacity and the preset weight limit are the same once-entered value and in other embodiments these can be two separate pieces of data.

For example, the programmed computer 152/154 can be programmed to receive and store a predefined maximum capacity (e.g., in pounds or kilograms) entered by a user and then compare the determined waste weight to the predefined maximum capacity. Upon the programmed computer 152/154 determining that the measured waste weight has reached (or exceeded) the predefined maximum weight, it operates to have a signal sent (e.g., via the communications module 146) to the compaction control unit to disable the hydraulic ram (e.g., by opening a limit switch or otherwise preventing electric power/signals from reaching and operating the hydraulic ram), thereby preventing further waste loading of the waste container.

In this way, the user of the waste container 100 can avoid for example government fines for hauling waste loads that exceed the legal weight maximums set for the particular roadway being used when hauling the waste container 100 to a dump site. These overweight fines are charged back to the user of the waste container 100 even though there was previously no reliable way to determine that the weight maximum had been exceeded before the waste had left the site. Conversely, because the programmed computer 152/154 can determine the appropriate time to send a notification that the waste container 100 should be picked up for emptying based on the determined current weight of the waste (rather than regularly, e.g., every week), the users of the waste container save money because there are no unnecessary pickups when the waste container may still have capacity (e.g., when at only 20% capacity).

Moreover, in embodiments in which the communications module 146 includes a transceiver (instead of only a transmitter), the programmed computer 152/154 can be programmed to send signals to the communications module for example for calibration purposes. Also, in embodiments in which the waste container and/or the weight-measurement system 140 include security-monitoring equipment (anti-tampering devices, motion detectors, etc.) in communication with the communications module 146, the programmed computer 152/154 can be programmed for generating and sending alarms or other notifications based on security-related data received from the communications module 146. And the programmed computer 152/154 can be programmed for determining revenue-related information based on the determined waste weights and pickups/emptyings over time, generate reports including the revenue-related information, and output (e.g., display or send electronically) the reports for review by users.

In typical embodiments, a service-provider user/company provides the waste container 100 and also services it using the weight-measurement system 140 by monitoring its weight, scheduling pickups for emptying, performing such pickups, etc. And the programmed computer 152/154 can be an Internet server and the service-provider company can have an Internet website (e.g., hosted by the Internet server) where it displays this information for accessing/reviewing by its customers (i.e., the actual waste-generating users) of the waste containers 100.

Details of related communications and control systems are disclosed by U.S. Patent Publication No. 2014/0156541 (U.S. Non-Provisional patent application Ser. No. 13/690,574 filed Nov. 30, 2012), which is hereby incorporated herein by reference. Also, such communications modules 146 and programmed computers 152/154 can be of a conventional type, and additional structural and operational details are not needed for a complete understanding of the invention, so such additional details are excluded for brevity.

With particular reference to FIGS. 5-10, structural and operational details of the scale devices 142 will now be described. The scale devices 142 are positioned supporting the waste container 106 and its contents, typically mounted to the base 118 below the container. The scale devices 142 can be provided by load cells that are incorporated into the wheel assemblies 122 to measure an applied force by creating a proportional electrical signal. In typical embodiments, the scale devices 142 are strain gauge load cells of a conventional type, preferably loadpin-type load cells used as axles of the wheel assemblies 122, so no additional or separate axle is included. In other embodiments, other types of load cells can be used, such as compression or shear-beam designs. Generally described, the weight placed into the waste container 100 pushes down on the wheel assemblies 122 with this force substantially absorbed by and generating deflection of the load cell axles 142. This deflection is converted into an electrical signal which is directly proportional the deflection and thus corresponds to and is read as a weight. This measured weight data is then transmitted via the communications systems 144 to the remote computer 152 for use in determining the waste weight (as described above). This measured weight data can also be transmitted via the communications systems 144 to other electronic devices for use by the service-providing company and/or the waste-generating user of the waste container 100.

The depicted axle load cells 142 are incorporated into the wheel assemblies 122, that is, they dual-function as the wheel axles and also measure the supported weight. Because the axle load cells 142 are used in place of conventional wheel axles, they are integrated into the waste container 100 so that no external (i.e., extra and dedicated component mounted to and extending from the container) weight-measuring component is required. In this way, the waste container 100 does not need to be raised to insert a weight-measuring pad underneath it, so there is no height/elevation interference with overhead chutes (for delivering waste into the container) or other related parts of the installation.

The axle load cells 142 are typically generally cylindrical and provided as a component in the assembled weight-measurement wheel assemblies 122. The wheel assemblies 122 each include a housing 156, one of the cylindrical axle load cells 142 fixedly mounted to the housing 156, and a wheel 158 rotationally mounted to the axle load cell. The axle load cells 142 can be fixedly mounted to the housing 156 by a brace member 164 with a portion that is received in a slot 165 of the corresponding axle load cell to retain the corresponding wheel 158 from relative axial and rotational movement, or by tab-and-slot or other mating keyed features. And the wheels 158 can each be rotationally mounted to the corresponding axle load cell 142 by a rolling bearing or bushing 159 to facilitate smooth rotation of the wheel about the axle load cell.

In typical embodiments, the housing 156 includes a mounting plate 160 and two side plates 162 that are spaced apart to receive the wheel 158 between them. The mounting plate 160 can be generally horizontally oriented and the side plates 162 can extend generally vertically downward from opposite ends of the mounting plate, together forming an inverted U-shaped bracket. The side plates 162 each include an opening through which the axle load cell 142 is received for mounting the axle load cell and thus the wheel 158 to the housing 156, so all the supported weight is transmitted from the container 106 through the housing to the axel load cells. Or the axle load cells can be mounted at their ends to support brackets mounted to the housing side plates. A spacer or bumper 161 (e.g., made of UHMW polyethylene) can be inserted between each side of the wheel 158 and each of the housing side plates 162 to facilitate smooth wheel rotation. The housing mounting plates 160 of the wheel assemblies 122 can be mounted to the base frame 118, or directly to the compacting/storing container 106, at mounting locations 166 (e.g., at four corners of a generally rectangular compacting/storing container), by conventional fasteners such as the depicted bolts.

The wheels 158 can be of a conventional size that is typically used for the waste container 100 for the particular application (no modification or customization is typically needed for use in the weight-measurement system 140). Typically, the wheels 158 are substantially rigid and solid (i.e., not hollow and inflatable), for example made of steel, so that they experience substantially no deformation under the load of the waste container 100 and its waste contents, and thus so that the load cells 142 accurately measure the supported load. In other embodiments, the wheels are not solid (e.g., they have internal cavities) but they include a sufficiently strong material, internal ribs or other reinforcements, or other conventional design and/or construction features, such that they are nevertheless substantially rigid and thus experience substantially no deformation under the load of the waste container and its waste contents.

In typical embodiments such as that depicted, the axle load cells 142 are rated at 0.5 mV output at 12,500 pounds, with a 20,000 pound capacity, and made primarily of nickel-plated or stainless steel (or another material selected for strength and durability). Also, the axle load cells 142 include a connector 168 for connecting the wiring 148 in hard-wired embodiments. Axle load cells 142 that can be modified for this use are commercially available from Measurement Systems International (Seattle, Wash.), a division of Rice Lake Weighing Systems Company (Rice Lake, Wis.).

In the embodiment described herein, the weight-measurement system 140 is provided in combination with the waste container 100 as an integrated assembly. In other embodiments, the weight-measurement system 140 is provided as a retrofit kit for installation (e.g., on-site) on an existing waste container 100 without a compatible communications system 144. In such embodiments, the weight-measurement system 140 in its entirety (including the wheel assemblies 122 with the scale devices 142 and including the communications system 144 with the communications module 146) is mounted to and includes the base frame 118 adapted to be inserted under and support the existing waste container 100. In yet other embodiments, the weight-measurement wheel assemblies 122 (including the axle load cells 142) by themselves (e.g., four of them) are provided as a retrofit kit for installation (e.g., on-site) on an existing waste container 100 with a communications system 144 (e.g., by swapping out conventional wheel assemblies with the weight-measurement wheel assemblies in the field and wiring them to the communications module 146. And in still other embodiments, the invention relates to a method of measuring the weight of waste in a waster container, for example stored on a non-transitory computer-readable storage device, for implementing the above-described functionality of using the load cells to measure the weight of the waste container and its waste contents and then determine the weight of the waste contents as the remainder after deducting the weight of the waste container.

In other embodiments of the weight-measurement system, four (or another number) of the axle-type load cells are used as axles for four (or another number) of wheels for a scaling frame or platform on which the bottom of the waste container rests and is supported to measure the weight of the waste container and the waste contents. And in other embodiments, one or more load cells are included in a pulley system configured for measuring the weight of the waste container and the waste contents.

FIG. 11 shows a waste container 200 outfitted with a weight-measurement system 240 according to a second example embodiment of the invention. The waste container 200 and the weight-measurement system 240 of this embodiment can be substantially the same as those described above, with noted exceptions. In particular, in this embodiment, instead of a load-pin load cell used as the axle for each wheel 258, each of the wheel assemblies 222 has a respective double-ended shear-beam load cell 241 mounted between it (e.g., its housing 256) and the waste container (e.g., its frame 218 or container bottom) 200 to measure the weight of the waste container and its waste contents. Suitable such DESB-type load cells are known in the art and commercially available from various manufacturers. In this embodiment, weight of the waste container 200 and its waste contents, and the known weight of the empty waste container, each additionally exclude the weight of the entire wheel assemblies 222.

FIG. 12 shows a waste container 300 outfitted with a weight-measurement system 340 according to a third example embodiment of the invention. The waste container 300 and the weight-measurement system 340 of this embodiment can be substantially the same as those described above, with noted exceptions. In particular, in this embodiment, instead of a load-pin load cell used as the axle for each wheel, the charge/storage container 306 floats on S-beam or double-ended shear-beam load cells 343 that are fixed to the base frame 318 (or to another support structure such as a floor). A hand lever is linked to the load cells 343 and operable to change the weighing system from a live weighing mode when stationary to a lock-out mode when the container 306 is rolled off the base frame 318 for emptying. Suitable such S-beam and/or DESB-type load cells are known in the art and commercially available from various manufacturers. In this embodiment, weight of the waste container 300 and its waste contents, and the known weight of the empty waste container, each additionally exclude the weight of the base framer 318.

In the embodiments described above, the weight-measurement system is integrated into the waste container, for example with the scale devices mounted to a wheeled base frame that is integral with and supports the waste container. In other embodiments, the weight-measurement system is provided separately from, and for retrofit use with, an existing conventional waste container. Examples of such embodiments will now be described.

FIGS. 13-14 show a prior-art waste container system 400 that can be used with a retrofit weight-measurement system according to a fourth example embodiment of the present invention. The existing waste container system 400 may be of any conventional type, such as the depicted large-capacity self-contained compactor, provided that it includes the bottom rail features described below for cooperating with the weight-measurement system to provide the functionality detailed herein.

In the depicted embodiment, the compactor-type waste container 400 includes a compacting/storage container 406 (also referred to as the "can") defining a compacting chamber in which the received waste materials are compacted and stored. The compacting/storage container 406 includes left and right sidewalls, bottom and top walls, and end walls. A powered compacting mechanism (not shown) typically includes a hydraulically operated ram that moves horizontally within the container 406 to compact the waste material in it. A compaction control system (not shown) includes conventional control components and connections for safely operating the hydraulic ram. Also, options for the waste container 400 can typically include dog houses, hoppers, and/or chutes for feeding the waste into it.

In addition, the waste container 400 includes a base frame 418 and multiple (e.g., typically four, optionally six or more) wheel assemblies 422 to support and enable easy movement of the compacting/storage container 406. The wheel assemblies 422 can be of a conventional type known in the art and are typically mounted to the base frame 418 or the bottom wall of the container 406 to support the container bottom wall above the ground or other support surface.

The base frame 418 includes two longitudinally arranged main support rails 420 that extend along and below the container 406. Typically, the two main support rails 420 include longitudinal portions 420a that extend downward from the bottom wall of the container 406 and extend along the entire length of the container 406 (from one end wall to the other end wall) and upright portions 420b extending laterally from and along at least lower portions of the two opposite end walls of the container 406, for example as depicted. Between the longitudinal portions 420a and the upright portions 420b at each end of the main rails 420 are curved transition portions 420c, for example as depicted.

The rails 420 provide structural strength for the container 406 so that it can store a heavy weight of waste material without failure, and thus do not extend downward into supporting contact with the ground or other support surface. Rather, the wheel assemblies 422 contact the ground and support the weight of the container 406. Thus, the rails 420 have a bottom surface 421 that is spaced above the ground or other support surface. The two main rails 420 are substantially parallel, that is, they are separated laterally by a uniform spacing/distance, for example with inner-facing, opposing side surfaces 423 that are spaced apart by a lateral distance R1 of about 29.5 inches to about 40 inches (depending on the specifications of the hauler), with 37 inches being typical and common. And at least two of the wheel assemblies 422 are spaced apart by a greater lateral minimum distance W (relative to the main-rail spacing R1) with the opposing wheels each positioned laterally to the outside of the main rails 420. Main rails 420 and wheel assemblies 422 of this type are very common on conventional waste containers 400, and this feature is used advantageously by the retrofit weight-measurement system, as described below.

The conventional waste container 400 can be used in a conventional manner to store and compact waste until full (or another selected condition), then hauled to a collection and/or waste disposal facility where the compacted waste is dumped or otherwise removed. Such compactor waste container systems 400 are commercially available from numerous suppliers, including BACE, LLC (Charlotte, N.C.). As the waste container 400 can be of such a conventional type, and additional structural and operational details are not needed for a complete understanding of the invention, such additional details are excluded for brevity.

Referring now to FIGS. 15-34, there are shown details of the retrofit weight-measurement system 440 according to the fourth example embodiment of the present invention. With particular reference to FIGS. 15-20, the weight-measurement system 440 can be retrofit to and used with existing conventional waste containers 400 to upgrade their capabilities and thereby avoid the cost of a replacement waste container outfitted with an integral weight-measurement system. The weight-measurement system 440 can also be provided as an option for new conventional waste containers 400 based on customer needs.

The weight-measurement system 440 can be used to weigh the waste contents of the waste container system 400. The weight-measurement system 440 is similar to the weight-measurement systems of the above-described embodiments in that it includes a plurality of scale devices 442 for weight sensing and a control/communication system for communicating wirelessly via a wireless communications network (such as the Internet or a cellular system) with a remote computer that runs application software operable to manipulate and display data received from the communications components. The remote computer and application software can be of the same type as in the above-described embodiments, so further details are not repeated for brevity. In some update embodiments, the software can now predict preventive maintenance, display current warranty status, and/or show past and present service information.

The control/communications system can include conventional control components (e.g., a programmed microprocessor, on/off inputs, display outputs) and conventional wireless communications components (e.g., an antenna and transceiver). As shown in FIGS. 32-34, the control/communications system of the depicted embodiment includes a control module 444 (e.g., a programmed microprocessor in a protective housing) and a control/communication panel/box 446 (e.g., on/off inputs, display outputs, an antenna, and a transceiver in a protective housing) to which the scale devices 442 are operably connected by wiring 448. In other embodiments, the control/communications components are integrated into the scale devices 442 and enable communication directly from the scale devices to the remote computer. Electrical power can be supplied by a solar panel and/or batteries that are included with the retrofit weight-measurement system 440, by a power cable for connecting to a local power source, and/or by the same power supply as used for the compaction control unit for the hydraulic ram. Because the control and communications components can be of the same type as in the above-described embodiments, and because their selection, interconnection, and assembly together is well within knowledge of persons of ordinary skill in the art, further details are not presented herein.

In contrast to the weight-measurement systems of the above-described embodiments that are integrated into the waste containers, the weight-measurement system 440 of this embodiment is a separate assembly. In particular, the weight-measurement system 440 includes a support frame 470 upon which the conventional waste container 400 is positioned during use, with a plurality of scale devices 422 mounted to the support frame and upon which the conventional waste container is supported during use.

The support frame 470 includes two substantially parallel, outward-facing, opposing longitudinal side guide surfaces 472 extending along a substantial portion of its length. The guide surfaces 472 are spaced apart by a substantially uniform distance R2 that is slightly less than the spacing R1 of the container main rails 420 such that the container 400 can be moved longitudinally onto and off of the frame 470 with the container rail inner-side guided surfaces 423 positioned outwardly of but guided by and along the frame outer-side guide surfaces 472 as the container 400 is moved on and off the frame 470. Thus, the frame outer side surfaces 472 are spaced far enough apart to not cause mechanical interference or frictional grabbing with the container rail inner side surfaces 423, but not so far apart that the container 400 can move laterally so far out of alignment that its main rails 420 do not engage the scale devices 442, as described below.

The frame outer-side guide surfaces 472 can be defined by two spaced-apart guide rails 474, as depicted, or by plates, tubes, blocks, or other structures that can be configured to provide the functionality described herein. For example, the guide rails 474 can be elongated, rectangular in cross-section, and made of metal (e.g., steel), and they can be connected together by cross members 476 of similar construction in order to form the frame 470 as a rigid and strong piece.

The support frame 470 can additionally include at least one tapered end for guiding the container main rails 420 into alignment with (slightly laterally outside of) the frame guide rails 474 as the container 400 is moved onto the frame 470. For example, the tapered end can be provided by two outward-facing, opposing longitudinal side alignment surfaces 478 that are angled with respect to the frame guide surfaces 472 so that they are spaced closer together farther longitudinally away from the frame guide surfaces 472. With the container 400 generally but not precisely aligned with the support frame 470 (i.e., with the container main rails 420 not both positioned outward of the frame guide rails 474), the container 400 can be moved into engagement with the support frame 470, and one of the container rail guided surfaces 423 will contact one of the frame alignment surfaces 478 and be guided by it to adjust the lateral position of the container 400 to provide a self-aligning feature for ease in mounting the large, cumbersome, and heavy container 400 onto the frame 470.

The frame outer-side alignment surfaces 478 can be defined by two spaced-apart alignment rails 480, as depicted, or by other structures that can be configured to provide the functionality described herein. For example, the alignment rails 480 can be of the same construction as the guide rails 474. The alignment rails 480 have one end that extends from the guide rails 474 and the other ends are connected together for example indirectly (e.g., by a short cross member 476, as depicted, to form a polygonal shape) or directly (e.g., in a blunt point).

The scale devices 422 are mounted to the support frame 470 and extend outwardly from it into positions that align with and are engaged by the container main rails 420 as the container 400 is moved onto the support frame 470. That is, the scale devices 422 have the same general lateral spacing R as the container main rails 420. The weight-measurement system 440 includes at least two scale devices (with one on each side of the frame 470), typically four scale devices (two on each side), and optionally another number of them.

The scale devices 422 each include a weight sensor 482 that can be of a conventional type that measures weight. For example, the weight sensors 482 can be provided by load cells that measure an applied force by creating a proportional electrical signal. In typical embodiments, the weight sensors 482 are strain gauge load cells of a conventional type, preferably loadpin-type load cells (for example, the same units used in the above-described embodiments). In other embodiments, other types of load cells can be used, such as compression or shear-beam designs.

Generally described, the weight placed into the waste container 400 pushes down on the load cells 482 with this force substantially absorbed by and generating deflection of the load cells 482. This deflection is converted into an electrical signal which is directly proportional to the deflection and thus corresponds to and is read as a weight. This measured weight data is then transmitted via the communications components/system to the remote computer for use in determining the waste weight (as described above). This measured weight data can also be transmitted via the communications components/systems to other electronic devices for use by the service-providing company and/or the waste-generating user of the waste container 400.

The depicted load cells 482 are substantially cylindrical (with their axes substantially transverse to the frame guide rails 474), fixedly mounted to the frame guide rails 474, and provided with protective coaxially-arranged sleeve covers 484 that are rotationally mounted to the load cells (a rotational bearing/bushing (not shown) can be located between the axle load cell 482 and the sleeve roller 484 to protect the axle load cell from friction from the rotating sleeve roller 484) to form roller assemblies 485, with the load cells dual-functioning as the roller axles and also measuring the supported weight. The rotational mounting of the sleeve cover 484 to the load cells 482 can be of a conventional rolling bearing or bushing type. And the roller sleeve covers 484 provide protection for the load cells 482 to reduce the risk of damage to them during use. In this way, as the container 400 is moved onto the support frame 470, the container main rails 420 are rolled over and across the load cells 482 that support them by the rotation of the sleeve covers 484 of the roller assemblies 485.

In other embodiments, the load cells or other weight sensors are rotationally mounted to the frame guide, with fixed protective sleeve covers or with no sleeve covers, to provide the rolling action. In still other embodiments, the load cells or other weight sensors are fixedly mounted to the frame guide, with fixed protective sleeve covers or with no sleeve covers, and the container main rails slide over them without any rolling action.

As noted above, the container main rails 420 each have a curved transition 420c at one end (or at both ends, which enables installing the container 400 onto the weight-measurement system 440 with either end of the container leading). And as just noted, the load cells 482 and covers 484 of the roller assemblies 485 are generally cylindrical and rotational. Also, the bottoms 421 of the container main rails 420 (when the container 400 is supported by its wheels 422 on generally flat ground) are positioned lower than upper weight-supporting surfaces 483 of the load cells 482 or covers 484 of the roller assemblies 485 (when the support frame 470 is supported on generally flat ground). So when the curved container main rails 420c come into contact with the curved roller assemblies 485, the interengagement of these curved surfaces under the force of the longitudinally moving container 406 (being moved for example by a large truck) induces the container main rails to be lifted up onto the roller assemblies. That is, the curvature of the roller assemblies 485 (from the perspective of the container main rails 420) provides a curved ramp engagement for elevating the container main rails. When the container 400 is lifted as a result of this, the container wheels 422 are lifted up off the ground or other support surface by a relatively small distance L (the lifted height need only be sufficient to provide good clearance, and for stability is typically minimized). When the container 400 is moved onto the weight-measurement system 440 until all its wheels 422 have been lifted up of the ground, then all of its weight is supported by the container main rails 420 resting upon the sensor/cover rollers 485.

Figure 20A:
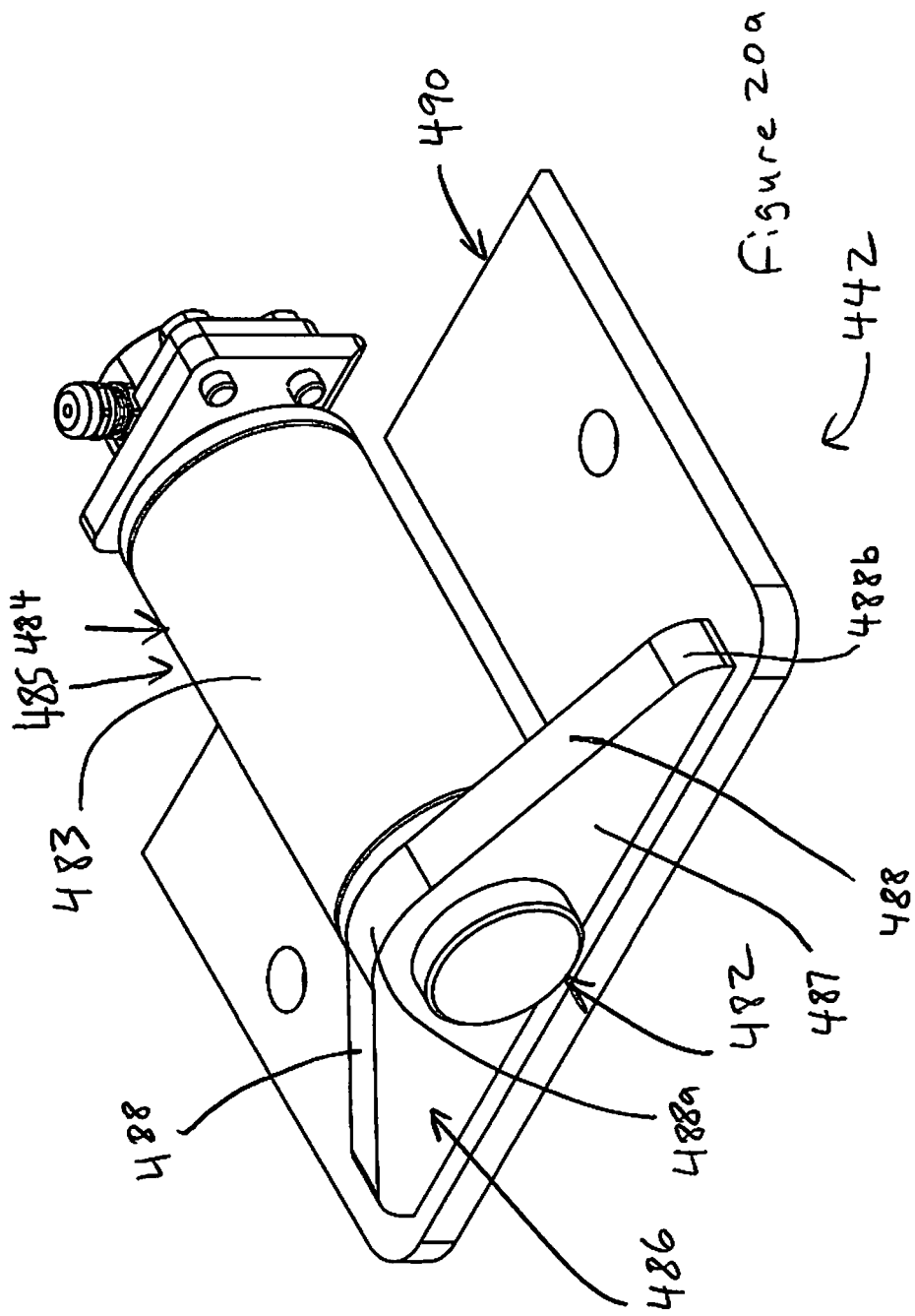
Figure 21:
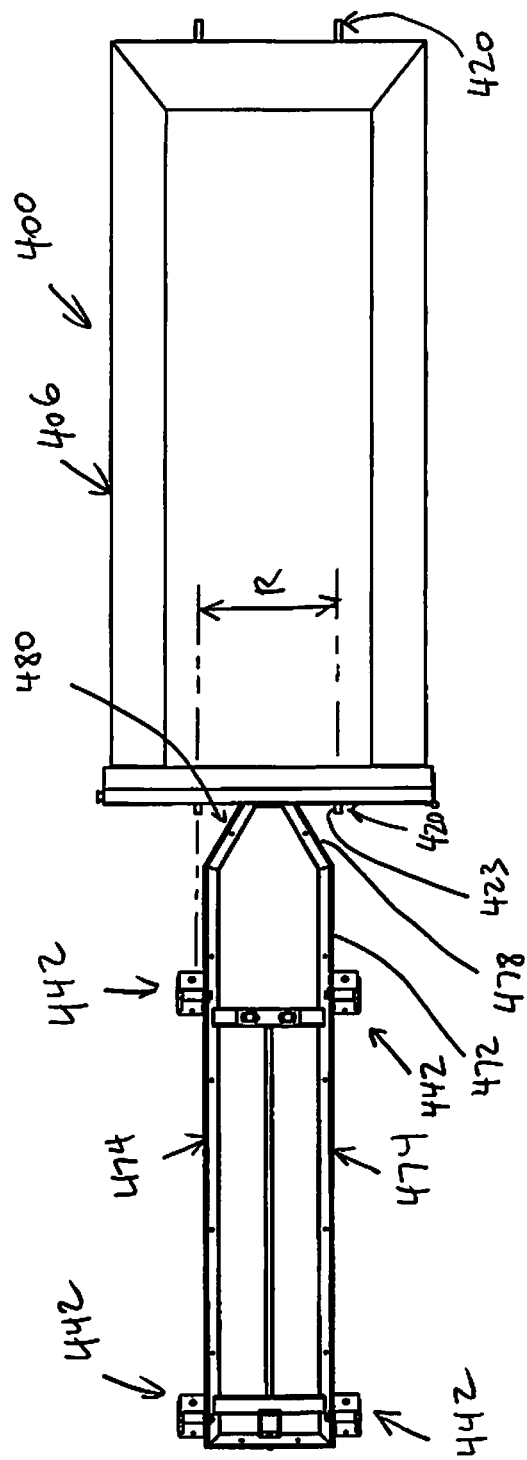
FIG. 21 is a plan view of the weight-measurement system and the waste container of FIG. 15, showing the waste container aligned and ready for retrofitting onto the weight-measurement system.

In some embodiments, the scale devices 442 optionally each include at least one ramp 486, for example as depicted, that aligns with, guides, and induces the container main rails 420 upward to lift the container 400 onto the weight sensors 482. The ramps 486 can each include at least one ramped surface 488 extending in a longitudinal direction, with an upper end 488a positioned approximately at but slightly below the top 483 of the respective weight sensor 482 or cover 484 of the roller 485 (without mechanically interfering with support of the container 400 by the roller assemblies 485) and with a lower end 488b positioned below the upper end and at an elevation (so that it is adjacent and generally close to the ground). The ramped surfaces 488 can be generally linear (as depicted) or they can be curved or have another regular or irregular shape. The ramps 486 can include upright support members 487 that are used as mounting brackets for the laterally outer ends of the weight sensors 482 and that can define the ramped surfaces 488 at the laterally outer ends of the scale devices 442, as depicted in FIG. 20a, and/or the ramps 486 can include laterally plates or other members extending laterally (e.g., inward from the upright members 487) across more or all of the width (laterally from inner to outer end) of the weight sensors 482 and forming the ramped surfaces 488, as depicted in FIG. 20b. Further optionally, the ramps 486 can be double-sided with two oppositely arranged ramped surfaces 488, for example as depicted in FIG. 20a, for such applications in which it might be desirable to be able to move the waste container onto the support frame 470 from either end. The ramps 486 can be suitable for applications including the use of waste containers having a wider main-rail spacing than that depicted, the use of waste containers having main rails that do not have curved end transitions, and/or the use of weight sensors that are not have a curved engagement surfaces.

In addition, the scale devices 442 can each further optionally include a foot 490 that rests on the ground or other support surface. The feet 490 can each have the ramps 486 mounted to them (e.g., by upright members 487) for additionally supporting the weight sensors 482 at their laterally outer ends (instead of only at their inner ends in a cantilevered design), though in some such embodiments the ramps do not support and lift the container main rails (or if they do they are configured to they do not interfere with the weight measuring) but only act as retainers to keep the container rails from shifting laterally as they're elevated onto the weight sensors. And the feet 490 can each include mounting holes for bolting down in place, for example as depicted. Also, the weight-measurement system 440 in the depicted embodiment is designed to be stationary and left in one place for use, though in other embodiments it can be designed for mobility (e.g., provided with wheels).

Referring now to FIGS. 21-31, further details of the construction and use of the weight-measurement system 440 will now be described. FIGS. 21-24 show the waste container 400 generally aligned with and ready for positioning (retrofit or new installation) onto the weight-measurement system 400. The container main rails 420 are positioned laterally outside of the support frame guide rails 474 and in line with the support frame scale devices 442, with the container main rails 420 and the support frame scale devices 442 both having a same general lateral spacing R, and with the container wheels 442 laterally outside of the scale devices. The alignment need not be precise, as the tapered self-aligning rails 480 of the support frame 470 will guide the container 400 into alignment during the container's advancing movement.

FIG. 25-26 show the waste container 400 being moved (as indicated by the linear directional arrow) longitudinally onto and along the support frame 470 of the weight-measurement system 440, with and the scale devices 442 about to be engaged. FIGS. 27-29 show the waste container 400 being farther moved (as indicated by the linear directional arrow) longitudinally onto and along the support frame 470 of the weight-measurement system 440, with the scale devices 442 now engaged by the container main rails 420 to cause the waste container 400 to lift up onto the frame guide rails 474, and with the container wheels 422 now off the ground. The waste container is then moved farther along the support frame 470 of the weight-measurement system 440, with the leading wheels 422 lifted (as indicted by the relatively short height or lift L) and that end portion of the waste container supported on the frame guide rails 474 by the container main rails 420, and with the trailing wheels 422 still on the ground supporting the trailing end portion of the container.

FIGS. 30-31 show the waste container 400 moved fully onto the weight-measurement system 440 to a use position with the scale devices 440 now all engaged and fully supporting the waste container with all of the container wheels 422 up off the ground. In this position, the full weight of the container 400 (including its contained waste) is borne by the scale devices 440. For emptying, the waste container 400 can simply be rolled off the weight-measurement system 440 and hauled away for emptying, then returned to the site and reinstalled upon the weight-measurement system 440 by the same steps as described above.

In the depicted embodiment, the weight-measurement system 440 has its guide rails 474 positioned laterally inside of its scale devices 442 so that each is aligned for interaction with the container main rails 420. In other embodiments, the guide rails are positioned laterally outside of the scale devices, with the scale devices having the same spacing as the container main rails but with the support frame guide rails spaced farther apart so that laterally inner side surfaces of the support frame guide rails are laterally outside of outer side surfaces of the container main rails for providing guidance and with the tapered end of the support frame having its alignment rails angled outward and not connected (to leave an opening for receiving the container main rails) instead of angled inward and connected/closed.

Also in the depicted embodiment, the weight-measurement system 440 is used with a waste container having wheels 422, though in other embodiments it can be adapted for use with waste containers that do not have wheels and that instead move along the ground by sliding on their main rails. Such embodiments can have substantially the same design as variations of the weight-measurement system 440 described herein, for example with ramps 486 for elevating the container main rails 420 (because they are not normally elevated by container wheels 422).

In another aspect of the invention, there is provided a method of upgrading the capabilities of a conventional waste container 400 by outfitting it with a weight-measurement system to weigh the waste contents of the waste container 400. Example methods include retrofitting an existing waste container 400 in the field by outfitting it with a weight-measurement system, and providing a new waste container 400 together with a weight-measurement system. The methods can include use of the weight-measurement system 440 described herein or variations and equivalents thereof.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in example forms, it will be apparent to those skilled in the art that many modifications, additions, and deletions can be made therein without departing from the spirit and scope of the invention as defined by the following claims.

What is claimed is:

1. A weight-measurement system for use with a waste container for storing waste and including two longitudinal main rails that are parallel and have a main rail lateral spacing, the weight-measurement system comprising:
   a guide frame including two longitudinal guide surfaces that are parallel and have a lateral spacing such that the frame guide surfaces are laterally adjacent, but not directly under and supporting, the two container main rails to guide the container main rails along and beside the guide frame as the waste container moves along and over the guide frame with the container supporting itself; and
   at least two scale devices that are mounted to the guide frame, with each scale device extending laterally away from a respective one of the frame guide surfaces so that the two scale devices are laterally offset from the respective frame guide surfaces, wherein the scale devices include weight sensors that are laterally offset from the respective frame guide surfaces and laterally separated from each other by the main rail lateral spacing such that they align with the container main rails as the waste container moves along and over the support frame,
   wherein in use the waste container is moved longitudinally relative to the support guide frame with the container supporting itself and with the container main rails guided by the frame guide surfaces until reaching a use position with the container main rails moved upward, onto, and supported by the weight sensors, wherein in the use position the full weight of the waste container including any stored waste is borne solely by the weight sensors.

2. The weight-measurement system of claim 1, wherein the support frame includes two longitudinal guide rails that define the frame guide surfaces.

3. The weight-measurement system of claim 1, wherein the frame guide surfaces are outward-facing on the support frame and have a lateral spacing, and wherein guided surfaces of the container main rails are inward-facing and have a lateral spacing that is greater than the lateral spacing of the outward-facing frame guide surfaces.

4. The weight-measurement system of claim 3, wherein the at least two scale devices extend laterally outward from the frame guide surfaces.

5. The weight-measurement system of claim 1, wherein the support frame further includes a tapered end portion with two angled alignment surfaces configured to engage and self-align the container main rails relative to the support frame.

6. The weight-measurement system of claim 1, wherein the weight sensors each have a cylindrical shape and an axis that is transverse to the frame guide surfaces to provide a curved ramp engagement with the container main rails to elevate the container main rails upon being moved into engagement with the weight sensors.

7. The weight-measurement system of claim 6, wherein the weight sensors are provided by load cells.

8. The weight-measurement system of claim 6, wherein the scale devices further include sleeve covers that are coaxially arranged on the weight sensors.

9. The weight-measurement system of claim 8, wherein the sleeve covers are rotationally mounted onto the weight sensors to cooperatively form roller assemblies with the weight sensors functioning as axles for the roller assemblies, wherein the roller assemblies roll the container main rails over and across them.

10. The weight-measurement system of claim 6, wherein the weight sensors are provided by load-pin load cells so that the load cells dual-function as the weight sensors and as the roller axles.

11. The weight-measurement system of claim 1, wherein the scale devices further include ramps extending longitudinally from the weight sensors to elevate the container main rails upon engagement therewith.

12. The weight-measurement system of claim 1, wherein the waste container further includes two sets of wheels laterally spaced apart from each other, wherein the weight sensors are positioned laterally inward or outward of, and do not align with, the two spaced apart wheel sets, and wherein in the use position the container wheels are elevated from contact with any support surface.

13. The weight-measurement system of claim 1, further comprising communication components adapted to communicate weight data from the weight sensors to a remote computer.

14. The weight-measurement system of claim 1 in combination with the waste container of claim 1.

15. A weight-measurement system for use with a waste container for storing waste and including two longitudinal main rails that are parallel and have a main rail lateral spacing and including two sets of wheels laterally spaced apart from each other, the weight-measurement system comprising:
- a guide frame positioned on ground and including two longitudinal guide rails defining two longitudinal guide surfaces that are parallel and have a lateral spacing such that the frame guide surfaces are laterally adjacent, but not directly under and supporting, the two container main rails to guide the container main rails along and beside the guide frame as the waste container moves along and over the guide frame with the container supporting itself; and
- at least two scale devices that are positioned on the ground and mounted to the guide frame, with each scale device extending laterally outward and away from a respective one of the frame guide surfaces so that the two scale devices are laterally offset from the respective frame guide surfaces, wherein the scale devices include weight sensors that are laterally offset from the respective frame guide surfaces and laterally separated from each other by the main rail lateral spacing such that they align with the container main rails as the waste container moves along and over the support frame, wherein the weight sensors are positioned laterally inward or outward of, and do not align with, the two spaced apart wheel sets, wherein the weight sensors are provided by load cells each having a cylindrical shape and an axis that is transverse to the frame guide surfaces to provide a curved ramp engagement with the container main rails to elevate the container main rails up onto the weight sensors upon being moved into engagement with the weight sensors,
wherein in use the waste container is rolled on its wheels over the ground longitudinally relative to the guide frame with the container supporting itself and with the container main rails guided by the frame guide surfaces until reaching a use position with the container main rails moved upward and onto and supported by the weight sensors, wherein in the use position the container wheels are elevated from contact with any support surface, and wherein in the use position the full weight of the waste container including any stored waste is borne solely by the weight sensors.

16. The weight-measurement system of claim 15, wherein the scale devices further include sleeve covers that are coaxially arranged on the weight sensors.

17. The weight-measurement system of claim 16, wherein the weight sensors are provided by load-pin load cells, wherein the sleeve covers are rotationally mounted onto the weight sensors to cooperatively form roller assemblies with the weight sensors functioning as axles for the roller assemblies, wherein the roller assemblies roll the container main rails over and across them, and wherein the load-pin load cells dual-function as the weight sensors and as the roller axles.

18. The weight-measurement system of claim 15, wherein the support frame further includes a tapered end portion with two angled alignment surfaces configured to engage and self-align the container main rails relative to the support frame.

19. A method of providing weight-measurement capabilities to a waste container for storing waste and including two longitudinal main rails that are parallel and have a lateral rail spacing, the method comprising:
- positioning a weight-measurement system including a guide frame and at least two scale devices;
- moving the waste container into alignment with the weight-measurement system so that the container main rails are generally aligned with the scale devices and laterally offset from two longitudinal guide surfaces of the guide frame;
- moving the waste container longitudinally relative to the guide frame, with the container supporting itself, and with the frame guide surfaces guiding the container main rails into engagement with the scale devices; and
- moving the waste container farther relative to the guide frame until reaching a use position with the container main rails moved upward, onto, and supported by the scale devices, wherein in the use position the full weight of the waste container including any stored waste is borne solely by the scale devices.

20. The weight-measurement system of claim 15, wherein the frame guide surfaces are outward-facing on the frame guide rails and have a lateral spacing, and wherein guided surfaces of the container main rails are inward-facing and have a lateral spacing that is greater than the lateral spacing of the outward-facing frame guide surfaces.

* * * * *